United States Patent
Egami et al.

(10) Patent No.: US 8,922,079 B2
(45) Date of Patent: Dec. 30, 2014

(54) ELECTRIC MOTOR AND CENTRALIZED POWER DISTRIBUTION MEMBER

(71) Applicants: Hitachi Cable, Ltd., Tokyo (JP); Hitachi Cable Fine-Tech, Ltd., Hitachi-shi, Ibaraki (JP)

(72) Inventors: Kenichi Egami, Kitaibaraki (JP); Kazuyuki Watanabe, Hitachi (JP)

(73) Assignee: Hitachi Metals Ltd., Tokyo (JP)

( * ) Notice: Subject to any disclaimer, the term of this patent is extended or adjusted under 35 U.S.C. 154(b) by 0 days.

(21) Appl. No.: 13/793,955

(22) Filed: Mar. 11, 2013

(65) Prior Publication Data
US 2013/0234549 A1  Sep. 12, 2013

(30) Foreign Application Priority Data

Mar. 12, 2012 (JP) .................. 2012-054077
Nov. 7, 2012 (JP) .................. 2012-245412

(51) Int. Cl.
*H02K 3/50* (2006.01)
*H02K 3/52* (2006.01)
*H02K 3/28* (2006.01)

(52) U.S. Cl.
CPC .............. *H02K 3/28* (2013.01); *H02K 2203/09* (2013.01); *H02K 3/522* (2013.01)
USPC ........................................................ 310/71

(58) Field of Classification Search
USPC ........................................................ 310/71
IPC ........................................................ H02K 3/50
See application file for complete search history.

(56) References Cited

U.S. PATENT DOCUMENTS

| 7,034,419 B2 | 4/2006 | Kabasawa et al. |
| 7,164,217 B2 | 1/2007 | Kabasawa et al. |

(Continued)

FOREIGN PATENT DOCUMENTS

| JP | 2004-096841 A | 3/2004 |
| JP | 2007-014083 A | 1/2007 |

(Continued)

OTHER PUBLICATIONS

Japanese Patent Office Issued an Office Action on April 16, 2013 and English Translation Thereof for Corresponding Japanese Application No. 2012-245412.

*Primary Examiner* — Dang Le
(74) *Attorney, Agent, or Firm* — Roberts Mlotkowski Safran & Cole P.C.

(57) ABSTRACT

An electric motor includes a stator including multiple phase windings wound around a plurality of teeth arranged in a circular pattern, and an annular bus ring arranged concentrically with the stator to supply drive current to the windings. The bus ring includes a metal conductor and a lead-out wire inserting portion for inserting a lead-out wire of the winding therethrough, the lead-out wire inserting portion being formed by bending the metal conductor. The lead-out wire inserting portion is crimped with the lead-out wire inserted therethrough such that the metal conductor is electrically connected to the lead-out wire.

14 Claims, 19 Drawing Sheets

(56) References Cited

U.S. PATENT DOCUMENTS

| | | |
|---|---|---|
| 7,374,462 B2 | 5/2008 | Kobayashi |
| 7,476,995 B2 | 1/2009 | Uchiyama et al. |
| 7,626,294 B2 * | 12/2009 | Ohta et al. ............ 310/71 |
| 7,948,130 B2 * | 5/2011 | Kitagawa ............... 310/71 |
| 8,154,163 B2 | 4/2012 | Inoue et al. |
| 2004/0070293 A1 | 4/2004 | Kabasawa et al. |
| 2006/0138884 A1 | 6/2006 | Kabasawa et al. |
| 2007/0004249 A1 | 1/2007 | Uchiyama et al. |
| 2008/0018193 A1 | 1/2008 | Kobayashi |
| 2009/0256439 A1 | 10/2009 | Inoue et al. |

FOREIGN PATENT DOCUMENTS

| | | |
|---|---|---|
| JP | 2007-135339 A | 5/2007 |
| JP | 2007-288821 A | 11/2007 |
| JP | 2008-029138 A | 2/2008 |
| JP | 2009-017666 A | 1/2009 |
| JP | 2009-261082 A | 11/2009 |

* cited by examiner

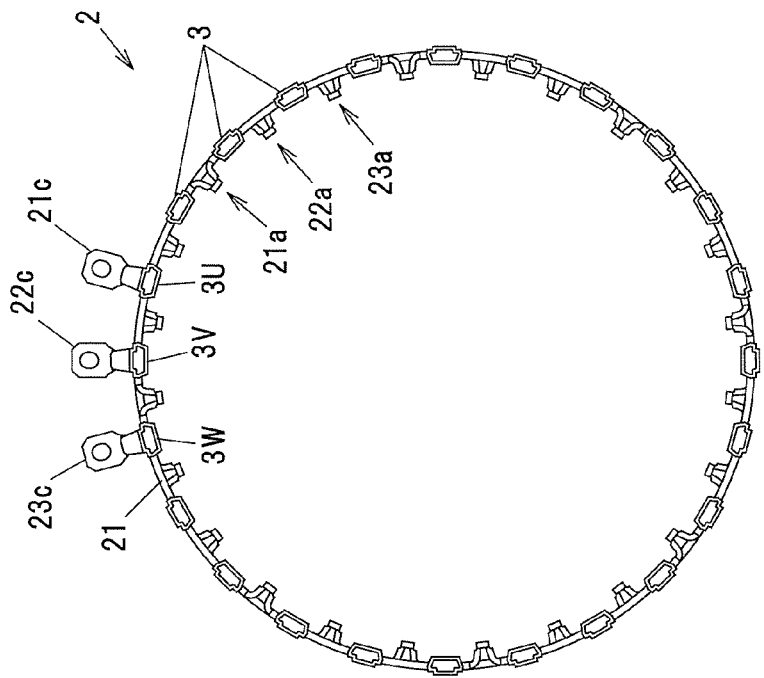
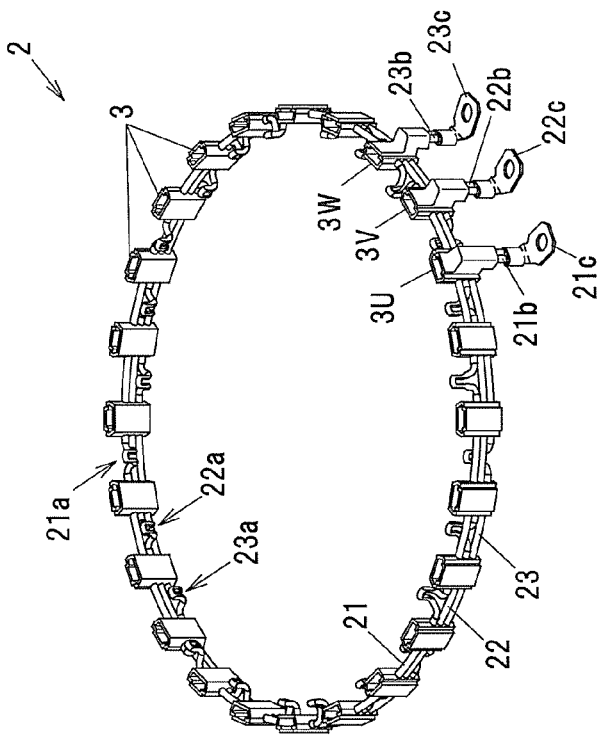

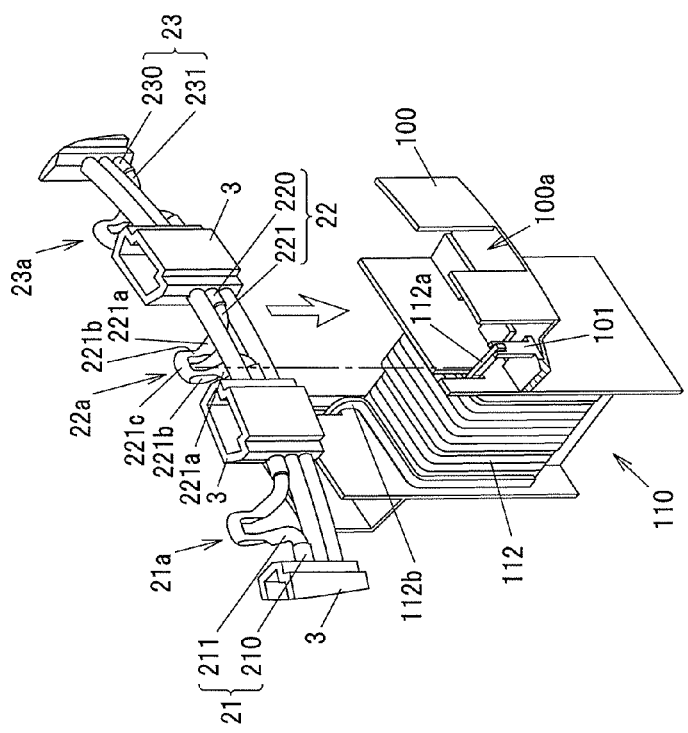
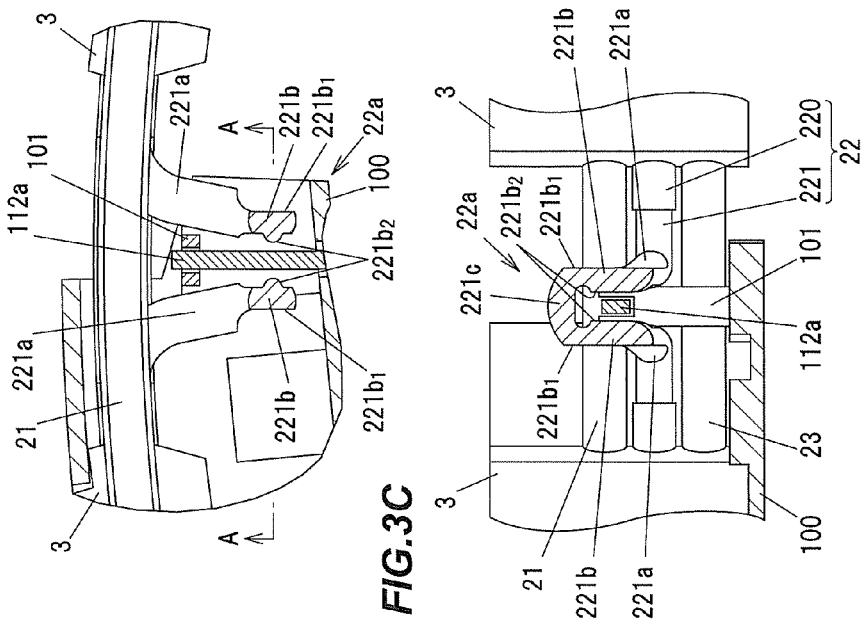
FIG. 3A
FIG. 3B
FIG. 3C

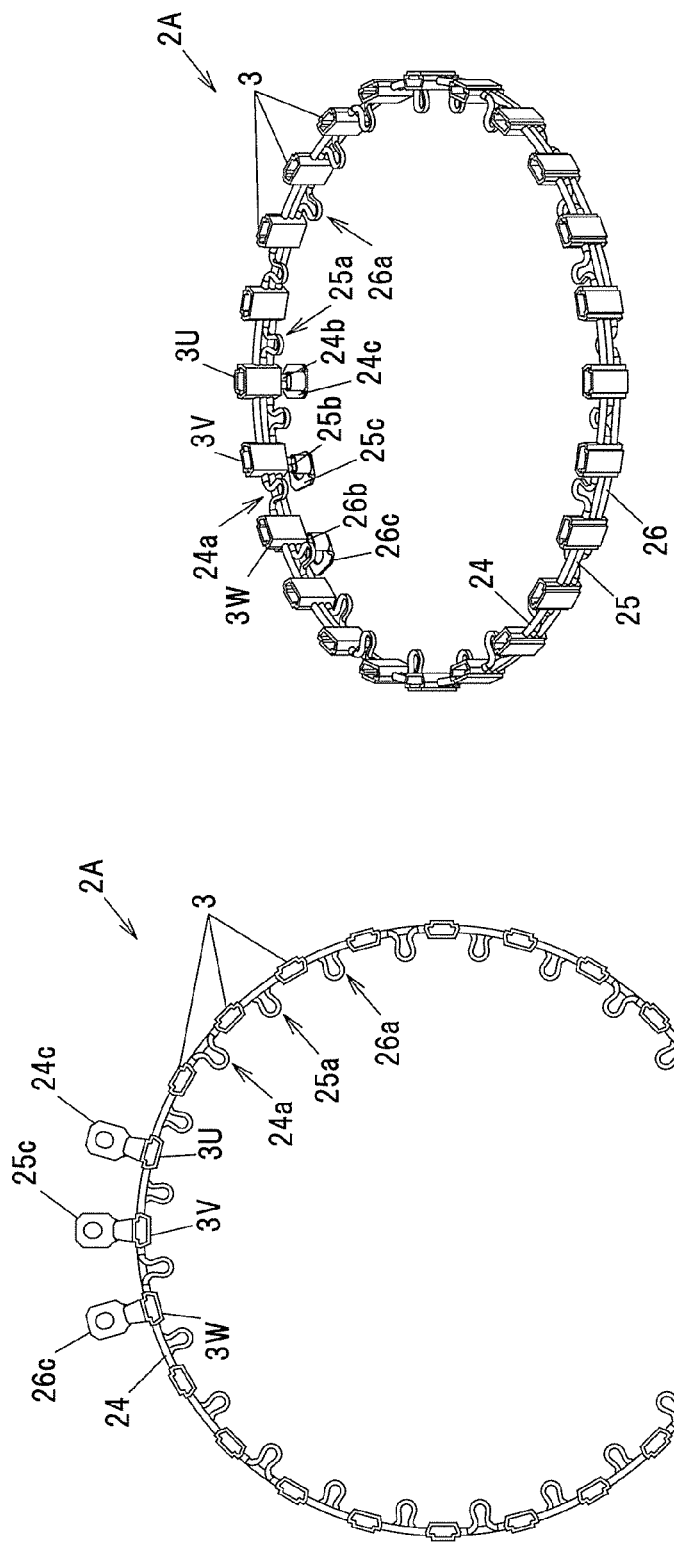

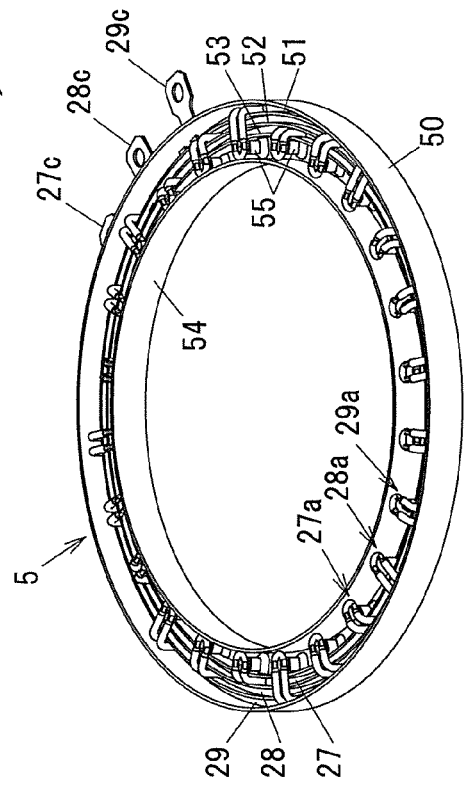
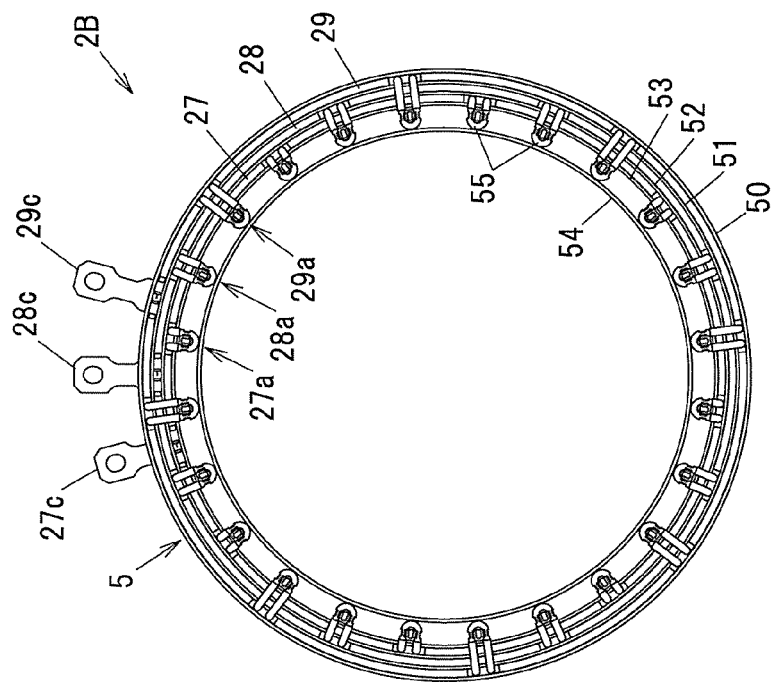

ELECTRIC MOTOR AND CENTRALIZED POWER DISTRIBUTION MEMBER

The present application is based on Japanese patent applications Nos. 2012-054077 and 2012-245412 filed on Mar. 12, 2012 and Nov. 7, 2012, respectively, the entire contents of which are incorporated herein by reference.

BACKGROUND OF THE INVENTION

1. Field of the Invention

The invention relates to an electric motor provided with a stator formed by winding windings around plural teeth and to a centralized power distribution member which collects and distributes power to the windings of the stator.

2. Description of the Related Art

A conventional centralized power distribution member, which is used in an electric motor and in which an electric current from an inverter is supplied to windings wound around plural circularly-arranged teeth, is known (see, e.g., JP-A-2009-261082 and JP-A-2004-96841).

An electricity collection and distribution ring (centralized power distribution member) described in JP-A-2009-261082 is provided with multiple phase bus rings for connecting the same-phase stator coils per phase of a multiple-phase rotating electrical machine, plural fixing members connected to the multiple phase bus rings at predetermined circumferential positions of the multiple phase bus rings, and connecting terminals fixed to predetermined positions of the multiple phase bus rings in a circumferential direction so as to be connectable to lead-out wires of the stator coils.

A centralized power distribution member described in JP-A-2004-96841 is composed of three concentrically stacked annular lead frames each of which is formed by combining plural frame parts each having a shape in which a pair of bent portions protrude inward from both ends of an arc portion. A winding of a stator is connected to the pair of adjacent bent portions. The winding of stator sandwiched and temporarily fixed between the pair of bent portions is soldered, thereby connecting the frame parts to the winding of the stator.

SUMMARY OF THE INVENTION

However, following problems arise when the centralized power distribution members described in JP-A-2009-261082 and JP-A-2004-96841 are used to manufacture an electric motor using.

That is, in the electricity collection and distribution ring described in JP-A-2009-261082, there are problems in that the number of components is increased since the connecting terminal is used to connect the lead-out wire of the stator coil to the bus ring, and in addition, that man-hours required for connection are increased since two connecting steps are required, one of which is connection of the connecting terminal to the multiple phase bus ring and another of which is connection of the lead-out wire of the stator coil to the connecting terminal.

In the centralized power distribution member described in JP-A-2004-96841, there is a problem in that man-hours required for connection are increased since it is necessary to temporarily fix the bent portions of the frame part to the coil of the stator and to further carry out soldering.

Accordingly, it is an object of the invention to provide an electric motor and a centralized power distribution member that can reduce the man-hours required for connecting a lead-out wire to a bus ring and the number of components.

(1) According to one embodiment of the invention, an electric motor comprises:
a stator comprising multiple phase windings wound around a plurality of teeth arranged in a circular pattern; and
an annular bus ring arranged concentrically with the stator to supply drive current to the windings,
wherein the bus ring comprises a metal conductor and a lead-out wire inserting portion for inserting a lead-out wire of the winding therethrough, the lead-out wire inserting portion being formed by bending the metal conductor, and
wherein the lead-out wire inserting portion is crimped with the lead-out wire inserted therethrough such that the metal conductor is electrically connected to the lead-out wire.

In the above embodiment (1) of the invention, the following modifications and changes can be made.

(i) The lead-out wire inserting portion is thermally crimped with the lead-out wire inserted therethrough such that the metal conductor and the lead-out wire are melted and joined together.

(ii) The lead-out wire inserting portion is thermally crimped, a contact area between the lead-out wire and the metal conductor is smaller than a contact area between the metal conductor and an electrode receiving an electric current for the thermal crimping.

(iii) The lead-out wire inserting portion has an Ω-shape and comprises a pair of bent portions and a curved portion formed therebetween, the bend portion being bent at an acute angle with respect to a circumferential direction of the bus ring.

(iv) The bus ring comprises a plurality of the lead-out wire inserting portions formed at a plurality of circumferential positions and a plurality of arc portions formed between the plurality of the lead-out wire inserting portions, and wherein the lead-out wire inserting portion protrudes in a radial direction of the plurality of arc portions.

(v) The bus ring comprises a plurality of bus rings,
wherein the plurality of the lead-out wire inserting portions of at least one of the plurality of bus rings protrude radially inward of the plurality of arc portions and the plurality of the lead-out wire inserting portions of other bus rings protrude radially outward of the plurality of arc portions.

(vi) A protruding direction of the lead-out wire inserting portions of the bus ring having the largest number of the plurality of the lead-out wire inserting portions among the plurality of bus rings is opposite to a protruding direction of the lead-out wire inserting portions of the other bus rings.

(vii) The plurality of bus rings are held by holding members provided at a plurality of positions in a circumferential direction, wherein the lead-out wire inserting portions of the at least one bus ring protrude radially inward from the holding members, and wherein the lead-out wire inserting portions of the other bus rings protrude radially outward from the holding members.

(viii) The lead-out wire inserting portions of the at least one bus ring and the lead-out wire inserting portions of the other bus rings protrude in a manner offset in a circumferential direction so as to be arranged at leading-out positions of the lead-out wires.

(2) According to another embodiment of the invention, a centralized power distribution member comprises:
an annular bus ring for collecting and distributing power to multiple phase windings of a stator that is formed by winding the windings around a plurality of teeth arranged in a circular pattern,
wherein the bus ring comprises a metal conductor and a lead-out wire inserting portion for inserting a lead-out wire of the winding therethrough, the lead-out wire inserting portion being formed by bending the metal conductor, and wherein the lead-out wire inserting portion is crimped with the lead-out wire inserted therethrough such that the metal conductor is electrically connected to the lead-out wire.

(3) According to another embodiment of the invention, a centralized power distribution member comprises:

an annular bus ring for collecting and distributing power to multiple phase windings of a stator that is formed by winding the windings around a plurality of teeth arranged in a circular pattern, the bus ring comprising a metal conductor, wherein the bus ring comprises a lead-out wire inserting portion with a lead-out wire of the winding inserted therethrough, the lead-out wire inserting portion being crimped with the lead-out wire inserted therethrough so as to be electrically connected to the lead-out wire, and wherein the lead-out wire inserting portion is formed by bending the metal conductor.

Points of the Invention

According to one embodiment of the invention, an electric motor is constructed such that the first to third bus rings are connected to the plural windings of U-, V- and W-phases by crimping the lead-out wire inserting portions. Therefore, it is possible to electrically connect therebetween without using a connecting terminal or soldering for the connection.

BRIEF DESCRIPTION OF THE DRAWINGS

Next, the present invention will be explained in more detail in conjunction with appended drawings, wherein:

FIGS. 2A and 2B show a centralized power distribution member, wherein FIG. 2A is a front view as viewed in an axial direction of the centralized power distribution member and FIG. 2B is a perspective view;

FIGS. 3A to 3C show an example of a connection structure between a lead-out wire inserting portions and a first lead-out wire, wherein FIG. 3A is a perspective view showing the lead-out wire inserting portion and the periphery thereof, FIG. 3B is a cross sectional view taken along the first lead-out wire and showing a state in which the first lead-out wire is inserted into the lead-out wire inserting portion and FIG. 3C is a cross sectional view taken along line A-A in FIG. 3B;

FIGS. 5A and 5B show a centralized power distribution member in a second embodiment of the invention, wherein FIG. 5A is a front view as viewed in an axial direction of the centralized power distribution member and FIG. 5B is a perspective view;

FIGS. 8A and 8B show a centralized power distribution member in a third embodiment of the invention, wherein FIG. 8A is a front view as viewed in an axial direction of the centralized power distribution member and FIG. 8B is a perspective view;

FIGS. 13A and 13B show a centralized power distribution member in a fourth embodiment of the invention, wherein FIG. 13A is a partial enlarged view and FIG. 13B is a cross sectional view of FIG. 13A taken along the first lead-out wire;

FIGS. 17A and 17B show a centralized power distribution member in a fifth embodiment of the invention, wherein FIG. 17A is a front view as viewed in an axial direction of the centralized power distribution member and FIG. 17B is a perspective view;

DETAILED DESCRIPTION OF THE PREFERRED EMBODIMENTS

First Embodiment

Figure 1:
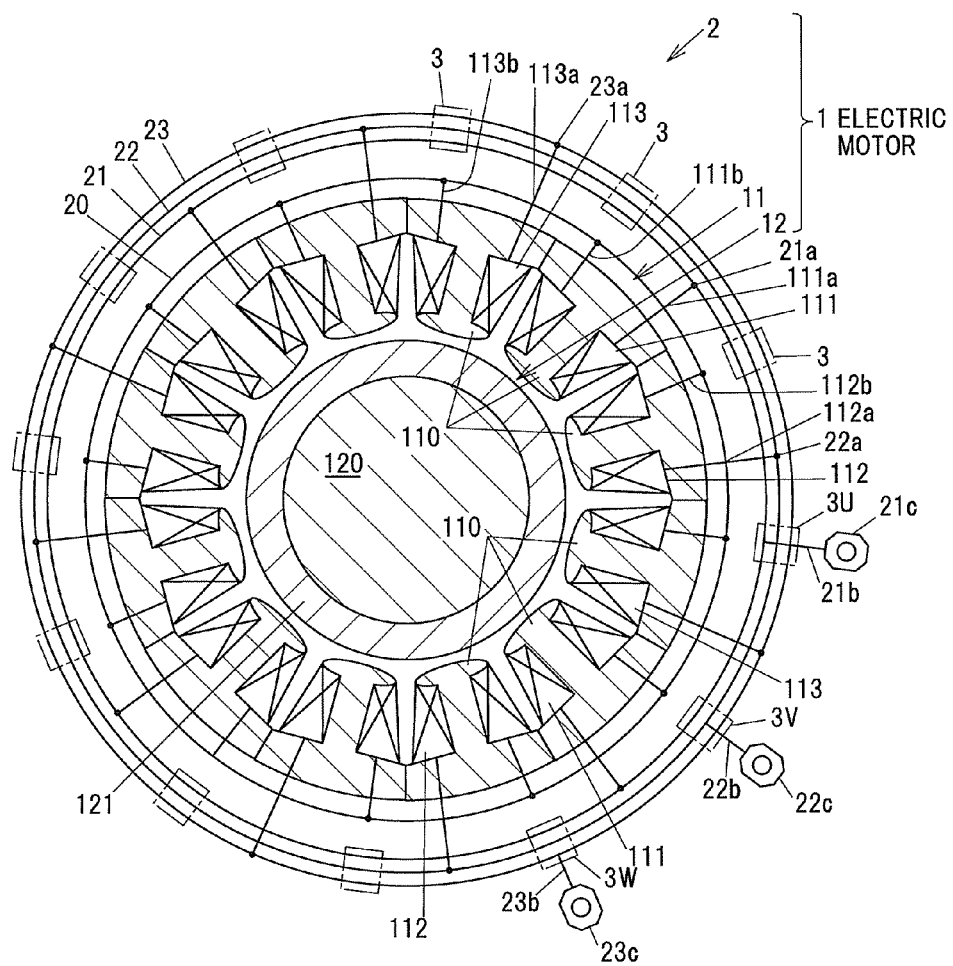
FIG. 1 is an explanatory schematic diagram illustrating a schematic structural example of an electric motor in a first embodiment of the present invention.

FIG. 1 is an explanatory schematic diagram illustrating a schematic structural example of an electric motor in the first embodiment of the invention. An electric motor 1 is provided with a stator 11, a rotor 12 and a centralized power distribution member 2 for distributing drive current to the stator 11.

The stator 11 is formed by winding multiple phase windings 111, 112 and 113 around plural teeth 110 formed of a magnetic material. The U-phase winding 111, the V-phase winding 112 or the W-phase winding 113 is wound around each tooth 110. The U-phase winding 111, the V-phase winding 112 and the W-phase winding 113 are arranged in this sequence along a circumferential direction of the stator 11 (a clockwise direction in FIG. 1).

The U-phase winding 111 is configured such that one end is a first lead-out wire 111a and another end is a second lead-out wire 111b. Likewise, the V-phase winding 112 is configured such that one end is a first lead-out wire 112a and another end is a second lead-out wire 112b. In addition, the W-phase winding 113 is configured such that one end is a first lead-out wire 113a and another end is a second lead-out wire 113b.

The rotor 12 has a shaft 120 rotatably supported by a non-illustrated shaft bearing so as to be coaxial with the stator 11 and a magnet 121 having plural magnetic poles and fixed to an outer peripheral surface of the shaft 120.

The centralized power distribution member 2 is provided with first to third bus rings 21 to 23 and plural holding members 3. The first to third bus rings 21 to 23 distribute drive current output from a non-illustrated inverter to each of the U-, V- and W-phase windings 111, 112 and 113 of the electric motor 1. The first to third bus rings 21 to 23 are arranged concentrically with the stator 11 and are held by the holding members 3 arranged at plural positions along a circumferential direction of the first to third bus rings 21 to 23.

The first lead-out wire 111a of the U-phase winding 111 is connected to the first bus ring 21. The first lead-out wire 112a of the V-phase winding 112 is connected to the second bus ring 22. The first lead-out wire 113a of the W-phase winding 113 is connected to the third bus ring 23.

In addition, the electric motor 1 is provided with an annular neutral conductor 20 to which the second lead-out wire 111b of the U-phase winding 111, the second lead-out wire 112b of the V-phase winding 112 and the second lead-out wire 113b of the W-phase winding 113 are connected. The neutral conductor 20 is arranged concentrically with the stator 11 as well as with the first to third bus rings 21 to 23.

A drive current having sine waveforms 120 degrees out of phase with each other is supplied to the U-phase winding 111, the V-phase winding 112 and the W-phase winding 113 from the non-illustrated inverter and this creates a rotating magnetic field in the stator 11. The magnet 121 receives a torque generated by an attractive force and a repulsive force caused by the rotating magnetic field and the shaft 120 is rotated by the torque.

FIGS. 2A and 2B show a structural example of the centralized power distribution member 2, wherein FIG. 2A is a front view as viewed in an axial direction of the centralized power distribution member 2 and FIG. 2B is a perspective view.

As shown in FIGS. 2A and 2B, the first to third bus rings 21 to 23 are arranged in parallel along an axial direction thereof and are fixed to each other by the plural holding members 3 formed of a molding resin. Lead-out wire inserting portions 21a, 22a and 23a for respectively inserting the first lead-out wires 111a, 112a and 113a are formed on the first to third bus rings 21 to 23 each at a position between two circumferentially adjacent holding members 3. Any one of the lead-out wire inserting portion 21a of the first bus ring 21, the lead-out wire inserting portion 22a of the second bus ring 22 and the lead-out wire inserting portion 23a of the third bus ring 23 is arranged between the two circumferentially adjacent holding members 3.

One of the plural holding members 3 is configured as a power feeding holding member 3U from which an end portion 21b of the first bus ring 21 protrudes in the axial direction of the first bus ring 21. In addition, another of the holding members 3 is configured as a power feeding holding member 3V from which an end portion 22b of the second bus ring 22 protrudes in the axial direction of the second bus ring 22. Yet another of the holding members 3 is configured as a power feeding holding member 3W from which an end portion 23b of the third bus ring 23 protrudes in the axial direction of the third bus ring 23. Power supply terminals 21c, 22c and 23c for receiving a supply of U-, V- and W-phase drive currents are respectively thermally crimped to the end portions 21b, 22b and 23b.

FIGS. 3A to 3C show an example of a connection structure between the lead-out wire inserting portion 21a, 22a or 23a and the first lead-out wire 111a, 112a or 113a, wherein FIG. 3A is a perspective view showing the lead-out wire inserting portions 21a, 22a and 23a and the periphery thereof, FIG. 3B is a cross sectional view taken along the first lead-out wire 112a and showing a state in which the first lead-out wire 112a is inserted into the lead-out wire inserting portion 22a and FIG. 3C is a cross sectional view taken along line A-A in FIG. 3B.

A holder 100 for holding the centralized power distribution member 2 is arranged on each tooth 110 on an outer peripheral side thereof. FIG. 3A shows a single tooth 110 and the holder 100 provided on the outer peripheral side thereof.

A rectangular window 100a is formed on the holder 100 by cutting out a portion thereof and a portion of the holding member 3 on the outer peripheral side is engaged with the window 100a. In addition, a lead-out wire holding portion 101 protruding in an axial direction of the stator 11 is provided on the holder 100. A tip of the lead-out wire holding portion 101 is formed in a two-pronged fork shape to support the first lead-out wire 111a, 112a or 113a (only the first lead-out wire 112a is shown in FIG. 3A).

Meanwhile, the second lead-out wire 111b, 112b or 113b of the winding 111, 112 or 113 is pulled to the inner peripheral side of each tooth 110 and is connected to the neutral conductor 20 (shown in FIG. 1) on the inner peripheral side of the stator 11.

The first bus ring 21 is composed of a metal conductor 211 formed of a good conductivity metal such as copper and an insulating resin sheath 210 covering the metal conductor 211, and the lead-out wire inserting portion 21a is formed by bending the metal conductor 211. Likewise, the second and third bus rings 22 and 23 are respectively composed of metal conductors 221 and 231 and sheaths 220 and 230, and the lead-out wire inserting portions 22a and 23a are formed by bending the metal conductors 221 and 231. The lead-out wire inserting portions 21a, 22a and 23a are formed on portions in which the sheaths 210, 220 and 230 are removed.

Since the lead-out wire inserting portions 21a, 22a and 23a are formed in the same manner, the lead-out wire inserting portion 22a of those will be taken as an example and described in more detail in reference to FIGS. 3A to 3C.

The lead-out wire inserting portion 22a is formed to protrude radially inward between a pair of holding members 3 which are adjacent to each other in a circumferential direction of the centralized power distribution member 2. The lead-out wire inserting portion 22a is composed of a pair of first extension portions 221a each extended from a portion covered with the sheath 220 toward the inside of the centralized power distribution member 2, a pair of second extension portions 221b each extended from a tip of the first extension portion 221a along the axial direction of the centralized power distribution member 2, and a coupling portion 221c for coupling between the pair of second extension portions 221b along the circumferential direction of the centralized power distribution member 2.

When the centralized power distribution member 2 is held by the holder 100, the first lead-out wire 112a is located between the pair of second extension portions 221b, as shown in FIGS. 3B and 3C. In other words, the first lead-out wire 112a is inserted between the pair of second extension portions 221b of the lead-out wire inserting portion 22a.

Protrusion $221b_2$ protruding toward the first lead-out wire 112a are formed on the pair of second extension portions 221b on surfaces facing the first lead-out wire 112a. In the first embodiment, the protrusion $221b_2$ is formed as a protruding strip having a semi-circular cross sectional shape and extending along an extending direction of the second extension portion 221b (the axial direction of the centralized power distribution member 2).

Meanwhile, in the pair of second extension portions 221b, surfaces opposite to the surfaces having the protrusions 221b$_2$ are formed as flat planar surfaces 221b$_1$. The planar surface 221b$_1$ of one of the pair of second extension portions 221b and that of the other second extension portion 221b are parallel to each other.

The lead-out wire inserting portion 22a is crimped in a state that the first lead-out wire 112a is inserted therethrough, and is thereby electrically connected to the first lead-out wire 112a.

Figure 4B:
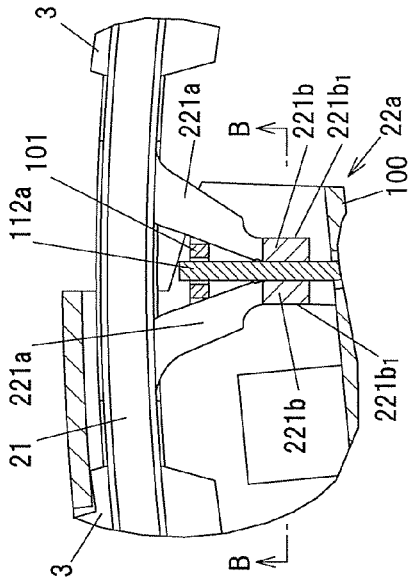
FIG. 4B is a cross sectional view taken along the first lead-out wire and showing the lead-out wire inserting portion and the periphery thereof after the crimping step and FIG. 4C is a cross sectional view taken along line B-B in FIG. 4B.
Figure 4C:
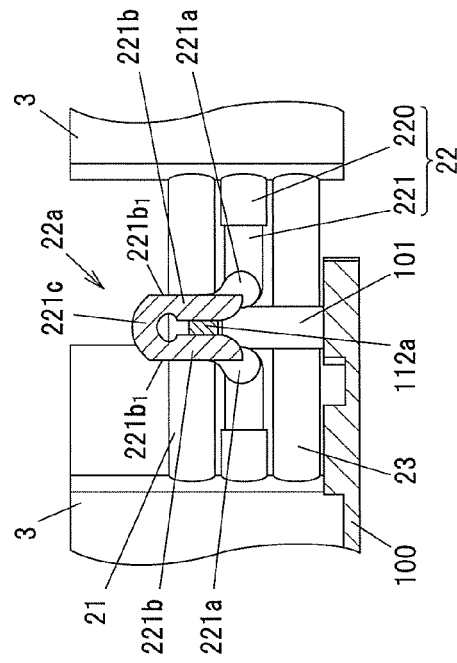
Figure 4A:
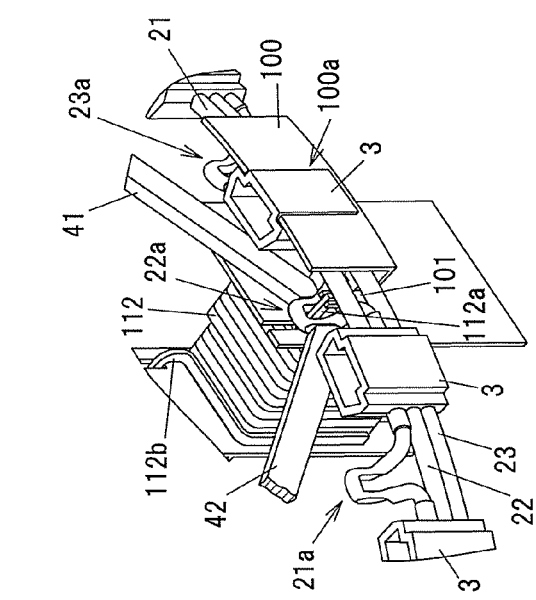
FIG. 4A is an explanatory diagram illustrating an example of a crimping step of crimping the lead-out wire inserting portion.

FIG. 4A is an explanatory diagram illustrating an example of a crimping step of crimping the lead-out wire inserting portion 22a.

The lead-out wire inserting portion 22a is crimped by thermal crimping (fusing or heat crimping) in which voltage is applied by a pair of electrodes 41 and 42, the pair of second extension portions 221b comes into contact with the first lead-out wire 112a and the pair of second extension portions 221b are welded to the first lead-out wire 112a by Joule heat generated by an electric current flowing through the pair of electrodes 41 and 42.

The electrode 41 is, e.g., a positive electrode and the electrode 42 is, e.g., a negative electrode. A tip portion of the electrode 41 is in surface-contact with the planar surface 221b$_1$ of one of the pair of second extension portions 221b and a tip portion of the electrode 42 is in surface-contact with the planar surface 221b$_1$ of the other of the pair of second extension portions 221b. In addition, the pair of second extension portions 221b are in line-contact with the first lead-out wire 112a at a top of the protrusion 221b$_2$. In other words, a contact area between the first lead-out wire 112a and the metal conductor 221 (the protrusions 221b$_2$ of the pair of second extension portions 221b) is smaller than a contact area between the electrodes 41, 42 and the metal conductor 221 (the planar surfaces 221b$_1$ of the pair of second extension portions 221b).

FIG. 4B is a cross sectional view taken along the first lead-out wire 112a and showing the lead-out wire inserting portion 22a and the periphery thereof after the crimping step and FIG. 4C is a cross sectional view taken along line B-B in FIG. 4B.

The lead-out wire inserting portion 22a is heated by a current flowing between the electrodes 41 and 42, and a portion of the second extension portion 221b including the protrusion 221b$_2$ and the first lead-out wire 112a are melted and joined together. As a result, the pair of second extension portions 221b deforms so as to approach each other, accompanied with deformation of the pair of first extension portions 221a.

The plural lead-out wire inserting portions 21a, 22a and 23a are each thermally crimped (or heat crimped) in the same manner. As a result, the first to third bus rings 21 to 23 are respectively electrically connected to the plural windings 111, 112 and 113 of U-, V- and W-phases.

Functions and Effects of the First Embodiment

The following functions and effects are obtained in the first embodiment.

(1) Since the first to third bus rings 21 to 23 are connected to the plural windings 111, 112 and 113 of U- and W-phases by crimping the lead-out wire inserting portions 21a, 22a and 23a, it is possible to electrically connect therebetween without using a connecting terminal or soldering for the connection.

(2) Since the metal conductors 211, 221 and 231 of the first to third bus rings 21 to 23 are directly connected (not via other members) to the first lead-out wires 111a, 112a and 113a of the plural windings 111, 112 and 113 of U-, V- and W-phases, it is possible to reduce electrical resistance between the first to third bus rings 21 to 23 and the windings 111, 112 and 113 as compared to, e.g., the case where other conductive members such as a connecting terminal are interposed.

(3) Since the lead-out wire inserting portions 21a, 22a and 23a of the first to third bus rings 21 to 23 are thermally crimped to the first lead-out wires 111a, 112a and 113a, it is possible to more firmly join the metal conductors 211, 221 and 231 to the windings 111, 112 and 113 than the case where the lead-out wire inserting portions 21a, 22a and 23a are crimped only by pressure.

(4) Since the contact areas of the first lead-out wires 111a, 112a and 113a with the metal conductors 211, 221 and 231 are smaller than those of the electrodes 41 and 42 with the metal conductors 211, 221 and 231, heat caused by a current supplied from the electrodes 41 and 42 is generated mainly at contact portions between the first lead-out wires 111a, 112a and 113a and the metal conductors 211, 221 and 231, which allows effective welding at the contact portions. In other words, as compared to the case of not having the protrusions 221b$_2$ (which are shown in FIGS. 3A and 3B), it is possible to weld the first lead-out wires 111a, 112a and 113a to the metal conductors 211, 221 and 231 with less current and also to suppress welding of the electrodes 41 and 42 to the metal conductors 211, 221 and 231.

Second Embodiment

Next, the second embodiment of the invention will be described in reference to FIGS. 5A to 7C. Constituent elements having substantially the same functions as those described in the first embodiment are denoted by the same reference numerals in FIGS. 5A to 7C and an overlapped explanation thereof will be omitted.

FIGS. 5A and 5B show a centralized power distribution member 2A in the second embodiment, wherein FIG. 5A is a front view as viewed in an axial direction of the centralized power distribution member 2A and FIG. 5B is a perspective view.

The centralized power distribution member 2A is provided with first to third bus rings 24 to 26 in place of the first to third bus rings 21 to 23 of the first embodiment. The first to third bus rings 24 to 26 are formed in an annular shape and are held by the plural holding members 3 in the same manner as the first to third bus rings 21 to 23 in the first embodiment but the shape of lead-out wire inserting portions 24a, 25a and 26a is different from that of the lead-out wire inserting portions 21a, 22a and 23a of the first embodiment.

One of the plural holding members 3 is configured as the power feeding holding member 3U from which an end portion 24b of the first bus ring 24 protrudes in an axial direction of the first bus ring 24, another of the holding members 3 is configured as the power feeding holding member 3V from which an end portion 25b of the second bus ring 25 protrudes in an axial direction of the second bus ring 25 and yet another of the holding members 3 is configured as the power feeding holding member 3W from which an end portion 26b of the third bus ring 26 protrude in an axial direction of the third bus ring 26. Power supply terminals 24c, 25c and 26c for receiving a supply of U-, V- and W-phase drive currents are respectively thermally crimped to the end portions 24b, 25b and 26b.

Figure 6:
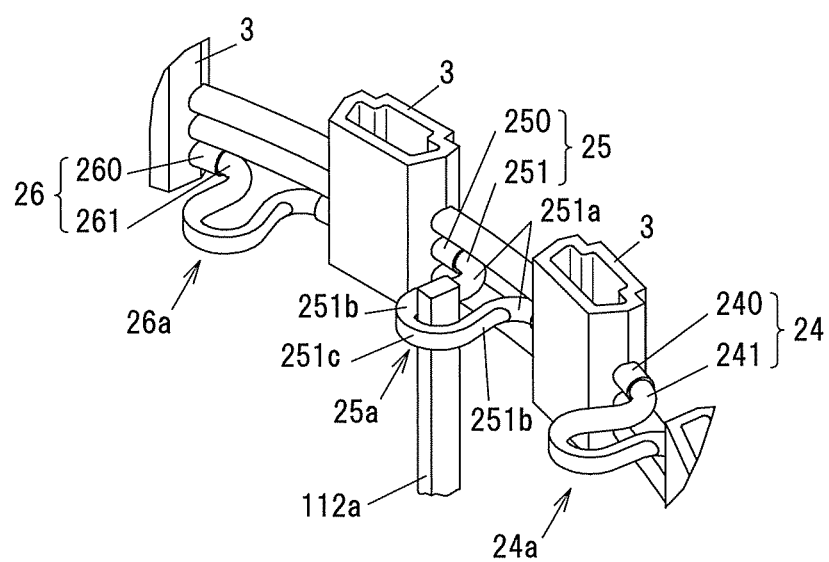
FIG. 6 is a partial enlarged view of the centralized power distribution member showing the lead-out wire inserting portions and the periphery thereof.

FIG. 6 is a partial enlarged view of the centralized power distribution member 2A showing the lead-out wire inserting portions 24a, 25a and 26a and the periphery thereof.

The first bus ring 24 is composed of a metal conductor 241 formed of a good conductivity metal such as copper and an insulating resin sheath 240 covering the metal conductor 241, and the lead-out wire inserting portion 24a is formed by bending the metal conductor 241. Likewise, the second and third bus rings 25 and 26 are respectively composed of metal conductors 251 and 261 and sheaths 250 and 260, and the lead-out wire inserting portions 25a and 26a are formed by bending the metal conductors 251 and 261. The lead-out wire inserting portions 24a, 25a and 26a are formed on portions in which the sheaths 240, 250 and 260 are removed.

Since the lead-out wire inserting portions 24a, 25a and 26a are formed in the same manner, the lead-out wire inserting portion 25a of the second bus ring 25 will be taken as an example and described in more detail.

Figure 7A:
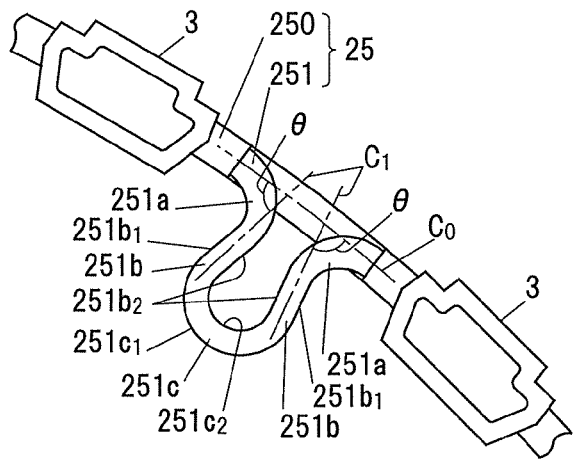
FIG. 7A is an explanatory diagram illustrating the lead-out wire inserting portion as viewed in an axial direction of a second bus ring and FIGS. 7B and 7C are schematic cross sectional views showing a cross-sectional shape of a metal conductor taken in a radial direction.

FIG. 7A is an explanatory diagram illustrating the lead-out wire inserting portion 25a as viewed in the axial direction of the second bus ring 25. It should be noted that, in FIG. 7A, an illustration of the first bus ring 24 located on the second bus ring 25 is omitted.

The lead-out wire inserting portion 25a is composed of a pair of bent portions 251a each bent at an acute angle with respect to a circumferential direction of the second bus ring 25, a pair of straight portions 251b linearly extending from respective end portions of the pair of bent portions 251a, and a curved portion 251c for coupling respective end portions of the pair of straight portions 251b in a circular-arc manner. In other words, the lead-out wire inserting portion 25a has an Ω-shape including the pair of bent portions 251a and the curved portion 251c which is formed therebetween.

As shown in FIG. 6, the first lead-out wire 112a is inserted in a region surrounded by the pair of bent portions 251a and the curved portion 251c.

The pair of straight portions 251b are formed to be smoothly continued from the end portions of the pair of bent portions 251a so that a gap between the straight portions 251b becomes wider toward front end portions thereof (toward the curved portion 251c side). When defining $C_1$ as a central axis of the straight portion 251b and $C_0$ as a tangent line at an intersection of the central axis $C_1$ with an extended line of a central axis of a portion of the second bus ring 25 covered with the sheath 250, an angle θ formed by the central axis $C_1$ and the tangent line $C_0$ is an acute angle (θ<90°). A desirable range of the angle θ is not less than 75° and not more than 85°.

Figure 7B:
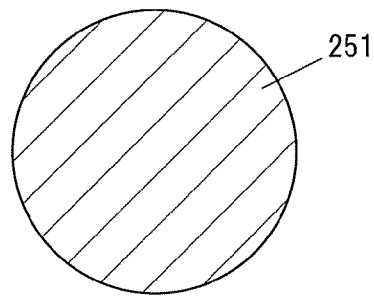
Figure 7C:
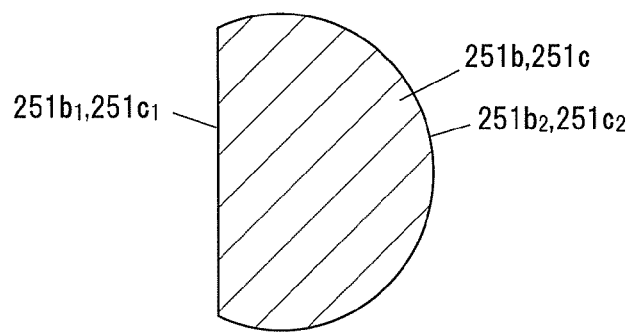

FIGS. 7B and 7C are schematic cross sectional views showing a cross-sectional shape of the metal conductor 251 taken in a radial direction (a cross sectional surface orthogonal to a central axis of the metal conductor 251), wherein FIG. 7B shows a cross sectional shape of the metal conductor 251 at the bent portion 251a and FIG. 7C shows a cross sectional shape of the metal conductor 251 at the straight portion 251b and the curved portion 251c.

The cross sectional shape of the metal conductor 251 is a perfect circle at the bent portion 251a as well as the portion covered with the sheath 250, as shown in FIG. 7B. Meanwhile, in the straight portion 251b of the metal conductor 251, a surface facing the outside of the region surrounded by the pair of bent portions 251a and the curved portion 251c is formed as a flat surface $251b_1$ and a surface facing the inside of this region is formed as an arc surface $251b_2$. Likewise, in the curved portion 251c, a surface facing the outside of the region surrounded by the pair of bent portions 251a and the curved portion 251c is formed as a flat surface $251c_1$ and a surface facing the inside of this region is formed as an arc surface $251c_2$.

Accordingly, the arc surface $251b_2$ of the straight portion 251b comes into line-contact with the first lead-out wire 112a when the lead-out wire inserting portion 25a is crimped. In addition, when the lead-out wire inserting portion 25a is thermally crimped by the electrodes 41 and 42 as shown in FIG. 4 in the first embodiment, the electrodes 41 and 42 come into surface-contact with the flat surface $251b_1$ of the straight portion 251b.

The plural lead-out wire inserting portions 24a, 25a and 26a are each crimped (thermal crimping) in the same manner. As a result, the first to third bus rings 24 to 26 are respectively electrically connected to the plural windings 111, 112 and 113 of U-, V- and W-phases (shown in FIG. 1).

The same functions and effects as those described in the first embodiment are obtained in the second embodiment. In addition, since the lead-out wire inserting portions 24a, 25a and 26a have an Ω-shape, deformation of the first to third bus rings 24 to 26 excluding the lead-out wire inserting portions 24a, 25a and 26a (deformation of the portions covered with the sheaths 240, 250 and 260) is suppressed at the time of crimping the lead-out wire inserting portions 24a, 25a and 26a. That is, if, e.g., the pair of straight portions 251b are parallel to each other, the portion of the second bus ring 25 excluding the lead-out wire inserting portion 25a is pulled when the pair of straight portions 251b approach each other by crimping the lead-out wire inserting portion 25a and the second bus ring 25 is deformed in a stretching manner. However, in the second embodiment, such deformation of the first to third bus rings 24 to 26 is suppressed since the lead-out wire inserting portions 24a, 25a and 26a have an Ω-shape.

It should be noted that the shape of the lead-out wire inserting portion 25a is not limited to that shown in FIG. 7A, etc., and the lead-out wire inserting portion 25a may be composed of, e.g., a pair of parallel lead-out wire portions protruding radially inward of the second bus ring 25 along a radial direction of the second bus ring 25 and an arc portion which has an inner diameter larger than the dimension between the pair of lead-out wire portions and connects between end portions of the pair of lead-out wire portions on the inner side. In this case, a connecting portion between the lead-out wire portion and the arc portion is equivalent of the bent portion and the arc portion excluding the bent portion is equivalent of the curved portion.

Third Embodiment

Next, the third embodiment of the invention will be described in reference to FIGS. 8A to 12B. Constituent elements having substantially the same functions as those described in the first embodiment are denoted by the same reference numerals in FIGS. 8A to 12B and an overlapped explanation thereof will be omitted.

Figure 9:
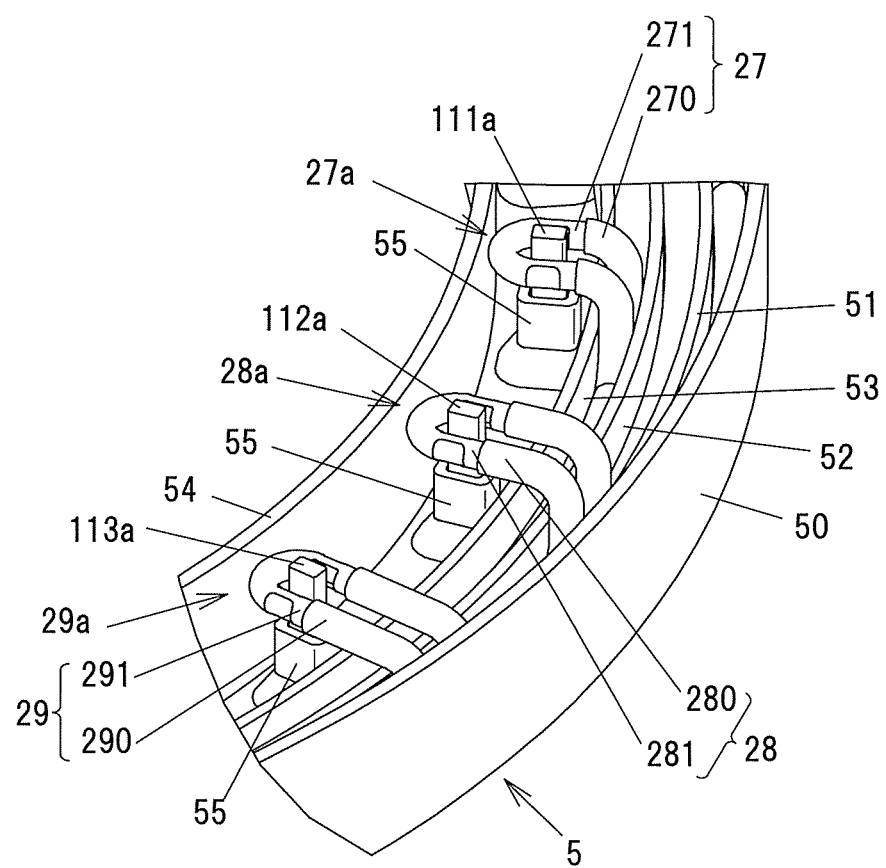
FIG. 9 is a partial enlarged view showing the centralized power distribution member together with the first lead-out wires.

FIGS. 8A and 8B show a centralized power distribution member 2B in the third embodiment, wherein FIG. 8A is a front view as viewed in an axial direction of the centralized power distribution member 2B and FIG. 8B is a perspective view. FIG. 9 is a partial enlarged view showing the centralized power distribution member 2B together with the first lead-out wires 111a, 112a and 113a.

The centralized power distribution member 2B is provided with first to third bus rings 27 to 29 in place of the first to third bus rings 21 to 23 of the first embodiment. While the first to third bus rings 21 to 23 in the first embodiment are arranged in parallel along the axial direction of the centralized power distribution member 2, the first to third bus rings 27 to 29 in the third embodiment are arranged in parallel in a radial direction of the centralized power distribution member 2B. In other words, the second bus ring 28 is concentrically arranged between the first bus ring 27 having the smallest diameter among the first to third bus rings 27 to 29 and the third bus ring 29 having the largest diameter.

A power supply terminal 27c for receiving a supply of a U-phase drive current is connected to the first bus ring 27 by thermal crimping. Likewise, power supply terminals 28c and 29c for receiving a supply of V- and W-phase drive currents are connected to the second and third bus rings 28 and 29 by thermal crimping.

The first to third bus rings 27 to 29 are held by an annular holding member 5 formed of an insulating resin and having an annular shape. The annular holding member 5 integrally includes an outer wall 50 provided on an outer peripheral side of a space for housing the third bus ring 29, a first partition wall 51 located inside of the outer wall 50 and partitioning into the space for housing the third bus ring 29 and a space for housing the second bus ring 28, a second partition wall 52 for partitioning into the space for housing the second bus ring 28 and a space for housing the first bus ring 27, a third partition wall 53 for partitioning into the space for housing the first bus ring 27 and a space located further inside, and an inner wall 54 formed inside of the third partition wall 53. The outer wall 50, the first to third partition walls 51 to 53 and the inner wall 54 are each formed in an annular shape and are arranged concentrically.

As shown in the enlarged view of the FIG. 9, plural cylindrical portions 55 for supporting the first lead-out wires 111a, 112a and 113a are provided between the third partition wall 53 and the inner wall 54. In addition, lead-out wire inserting portions 27a, 28a and 29a for respectively inserting the first lead-out wires 111a, 112a and 113a supported by the cylindrical portions 55 are formed on the first to third bus rings 27 to 29.

The first bus ring 27 is composed of a metal conductor 271 and an insulating resin sheath 270 covering the metal conductor 271, and the lead-out wire inserting portion 27a is formed by bending the metal conductor 271. Likewise, the second and third bus rings 28 and 29 are respectively composed of metal conductors 281 and 291 and sheaths 280 and 290, and the lead-out wire inserting portions 28a and 29a are formed by bending the metal conductors 281 and 291.

The first lead-out wire 111a is inserted into the lead-out wire inserting portion 27a of the first bus ring 27 at a position where the lead-out wire inserting portion 27a faces the cylindrical portion 55 over the third partition wall 53. The first lead-out wire 112a is inserted into the lead-out wire inserting portion 28a of the second bus ring 28 at a position where the lead-out wire inserting portion 28a faces the cylindrical portion 55 over the second and third partition walls 52 and 53. The first lead-out wire 113a is inserted into the lead-out wire inserting portion 29a of the third bus ring 29 at a position where the lead-out wire inserting portion 29a faces the cylindrical portion 55 over the first to third partition walls 51 to 53.

Since the lead-out wire inserting portions 27a, 28a and 29a are formed in the same manner, the lead-out wire inserting portion 29a of those will be taken as an example and described in more detail in reference to FIGS. 10A to 12B.

Figure 10A:
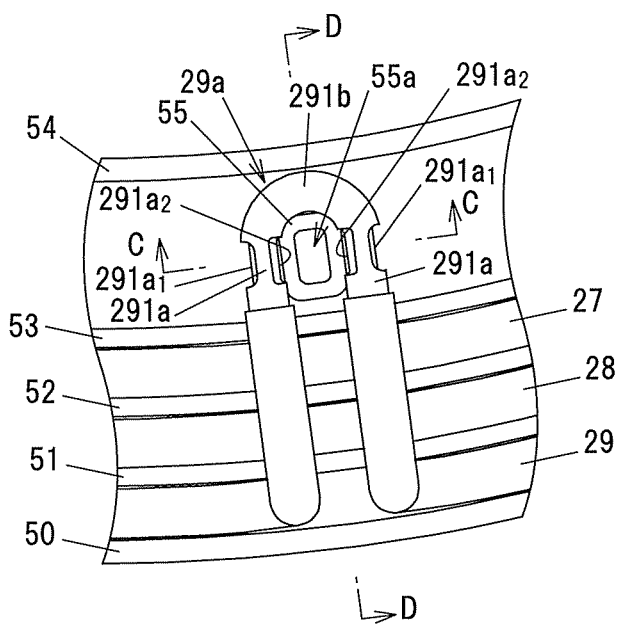
FIG. 10A is an explanatory diagram illustrating the lead-out wire inserting portion and the periphery thereof as viewed in an axial direction of a holding member and FIG. 10B is a cross sectional view taken along line C-C in FIG. 10A.
Figure 10B:
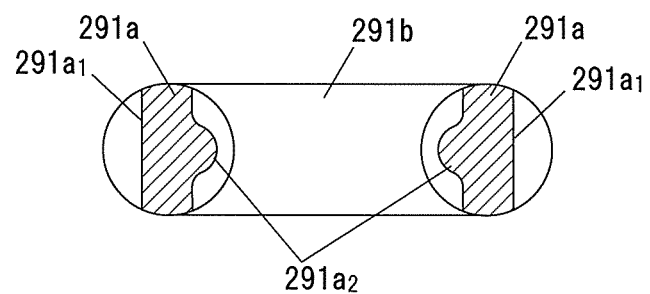
Figure 11A:
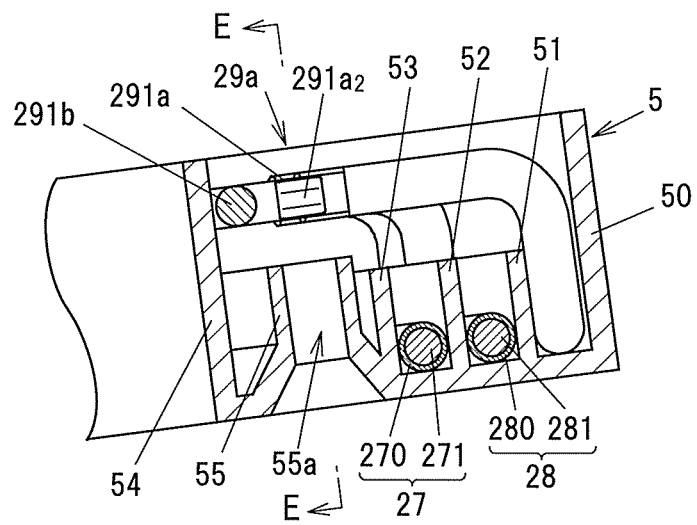
FIG. 11A is a cross sectional view taken along line D-D in FIG. 10A
Figure 11B:
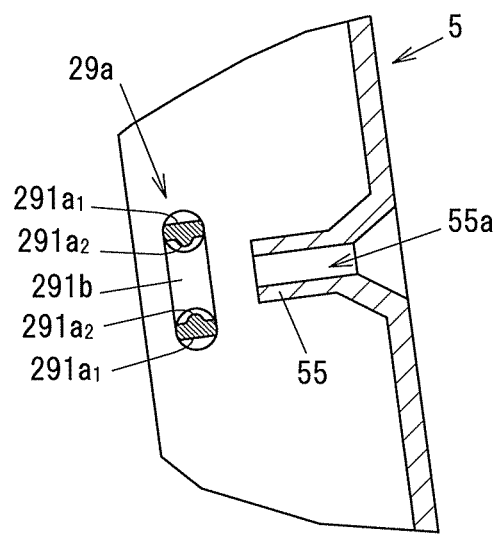
FIG. 11B is a cross sectional view taken along line E-E in FIG. 11A.

FIG. 10A is an explanatory diagram illustrating the lead-out wire inserting portion 29a and the periphery thereof as viewed in an axial direction of the annular holding member 5. FIG. 10B is a cross sectional view taken along line C-C in FIG. 10A. FIG. 11A is a cross sectional view taken along line D-D in FIG. 10A. FIG. 11B is a cross sectional view taken along line E-E in FIG. 11A.

The lead-out wire inserting portion 29a is composed of a pair of straight portions 291a extending inward along a radial direction of the annular holding member 5 and a curved portion 291b for coupling respective end portions (front end portions on the inner side) of the pair of straight portions 291a in a circular-arc manner. The pair of straight portions 291a are formed parallel to each other and the curved portion 291b is formed in a semi-circular shape.

As shown in FIGS. 10A and 10B, protrusions $291a_2$ are formed on the facing surfaces of the pair of straight portions 291a. In the third embodiment, the protrusion $291a_2$ is formed as a protruding strip having a semi-circular cross sectional shape and extending along an extending direction of the straight portion 291a (the radial direction of the annular holding member 5).

Meanwhile, surfaces of the pair of straight portions 291a opposite to the surfaces having the protrusions $291a_2$ are formed as flat planar surfaces $291a_1$. The planar surface $291a_1$ of one of the pair of straight portions 291a and that of the other straight portion 291a are parallel to each other.

When viewing the lead-out wire inserting portion 29a from the axial direction of the annular holding member 5, a through-hole 55a formed in the cylindrical portion 55 is located between the protrusion $291a_2$ of one of the pair of straight portions 291a and the protrusion $291a_2$ of the other straight portion 291a, as shown in FIG. 10A.

Figure 12A:
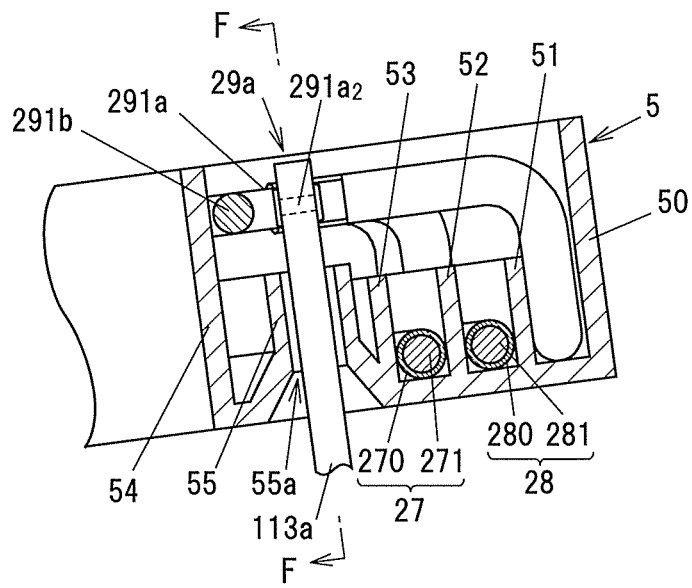
FIGS. 12A and 12B are diagrams based on FIGS. 11A and 11B and illustrating a state in which the first lead-out wire is held in a through-hole of a cylindrical portion.
Figure 12B:
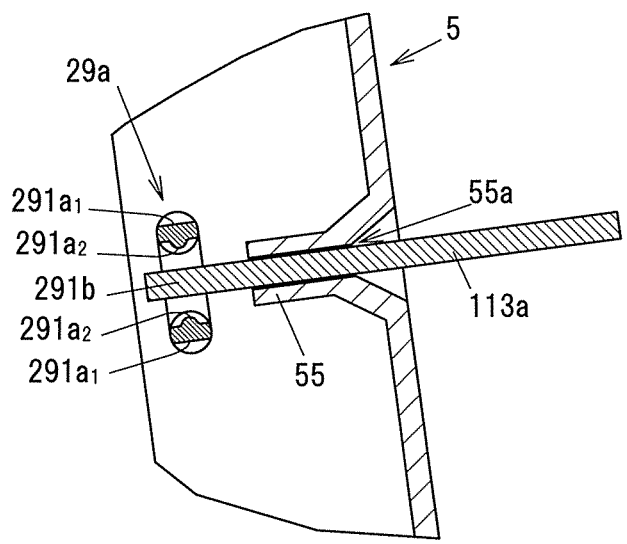

FIGS. 12A and 12B are based on the FIGS. 11A and 11B and show a state in which the first lead-out wire 113a is held in the through-hole 55a of the cylindrical portion 55.

The first lead-out wire 113a penetrates through the through-hole 55a so as to be parallel to the axial direction of the annular holding member 5. The front end portion of the through-hole 55a is located between the protrusions $291a_2$ of the pair of straight portions 291a of the lead-out wire inserting portion 29a.

The protrusions $291a_2$ of the straight portions 291a come into contact with the first lead-out wire 113a when the lead-out wire inserting portion 29a is crimped. In addition, when the lead-out wire inserting portion 29a is thermally crimped by the electrodes 41 and 42 as shown in FIG. 4 in the first embodiment, the electrodes 41 and 42 come into surface-contact with the planar surfaces $291a_1$ of the straight portions 291a.

The plural lead-out wire inserting portions 27a, 28a and 29a are each crimped (thermal crimping) in the same manner. As a result, the first to third bus rings 27 to 29 are respectively electrically connected to the plural windings 111, 112 and 113 of U-, V- and W-phases (shown in FIG. 1).

In the third embodiment, the same functions and effects as (1) to (4) described in the first embodiment are obtained. In addition, since the first to third bus rings 27 to 29 are arranged in parallel in the radial direction, the centralized power distribution member 2B can be thinned in the axial direction.

Fourth Embodiment

Next, the fourth embodiment of the invention will be described in reference to FIGS. 13A to 16B.

Figure 13A:
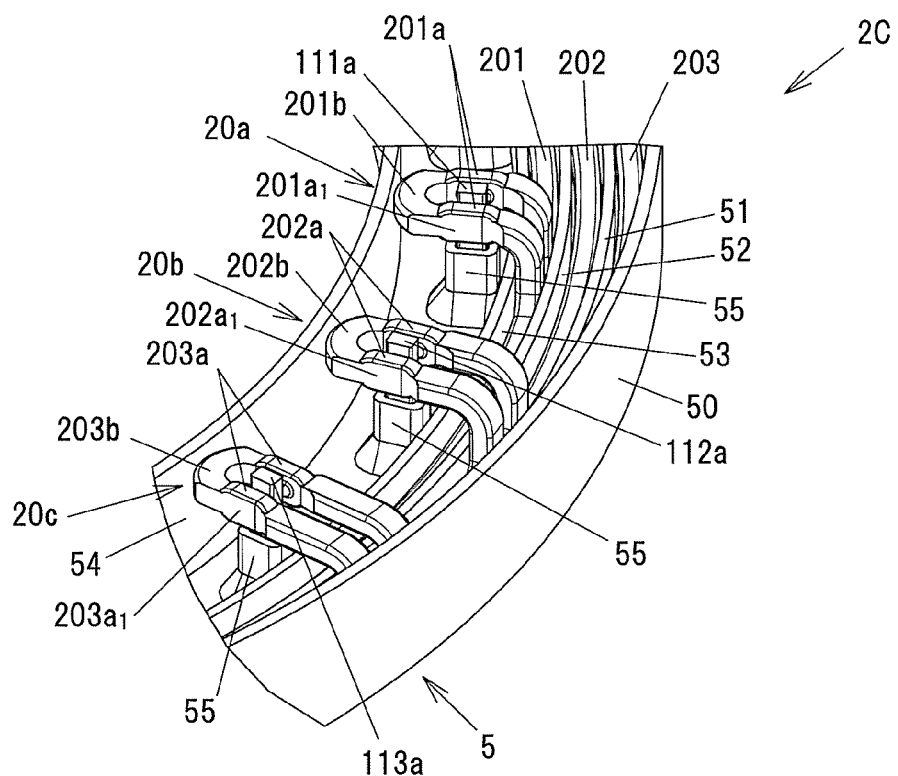
Figure 13B:
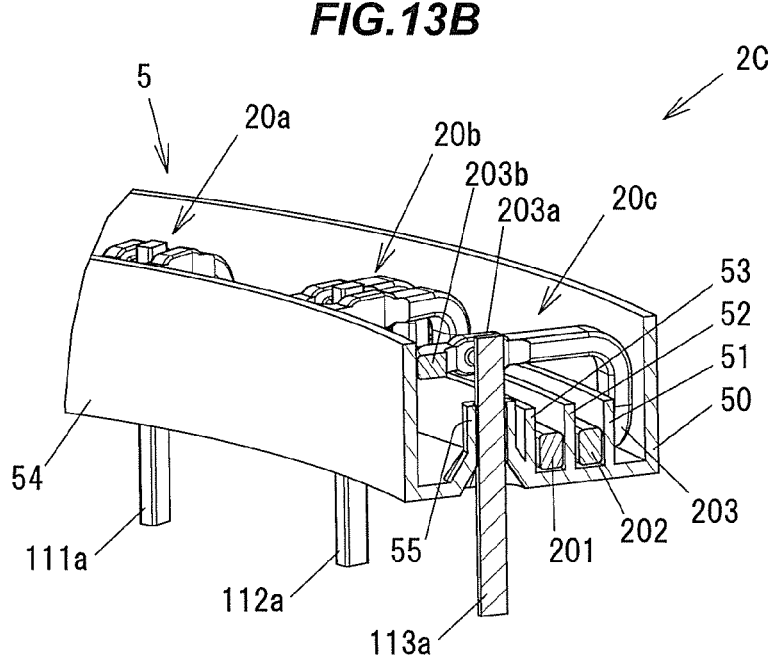
Figure 14A:
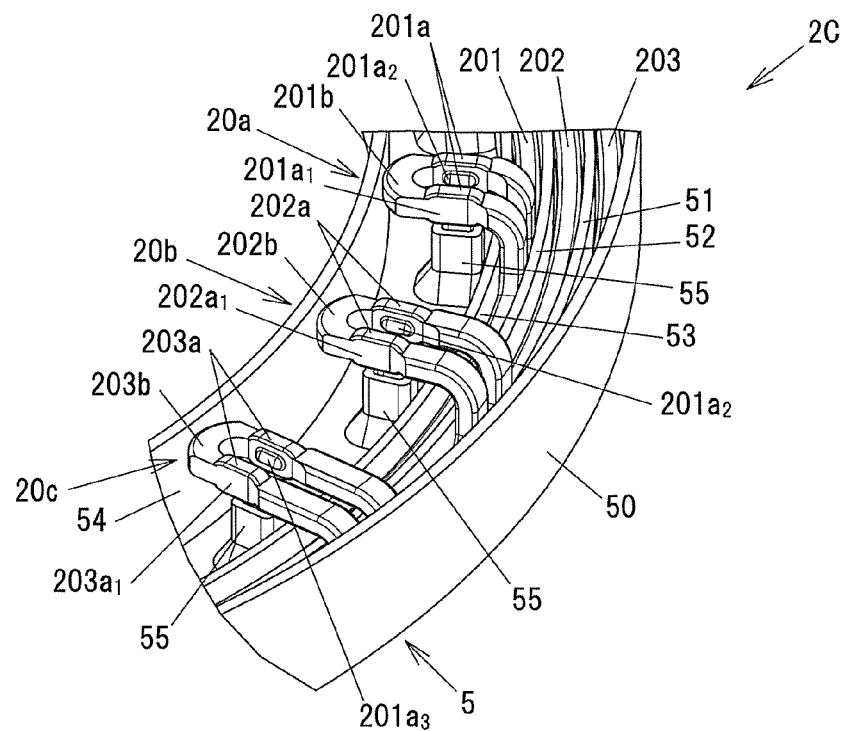
FIGS. 14A and 14B are diagrams based on FIGS. 13A and 13B but an illustration of the first lead-out wires is omitted.
Figure 14B:
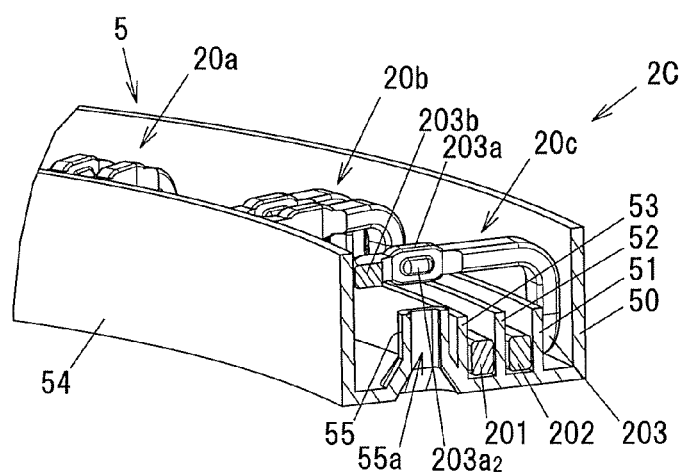
Figure 15:
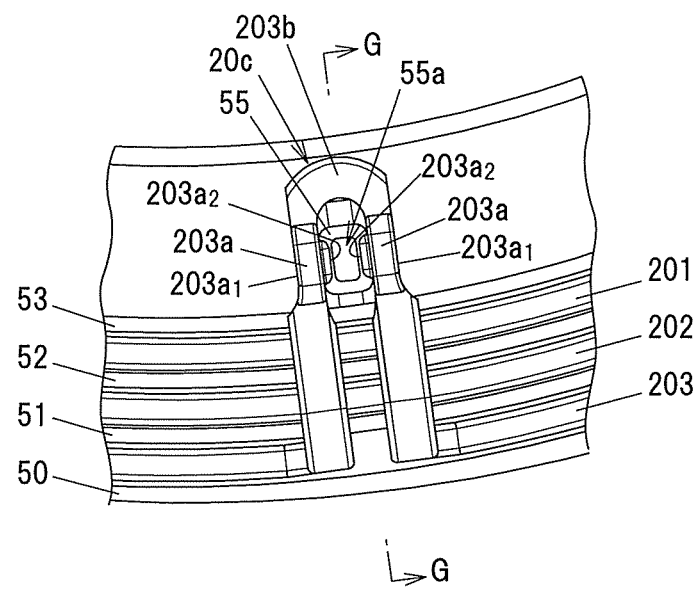
FIG. 15 is an explanatory diagram illustrating the lead-out wire inserting portion and the periphery thereof as viewed in an axial direction of an annular holding member.
Figure 16A:
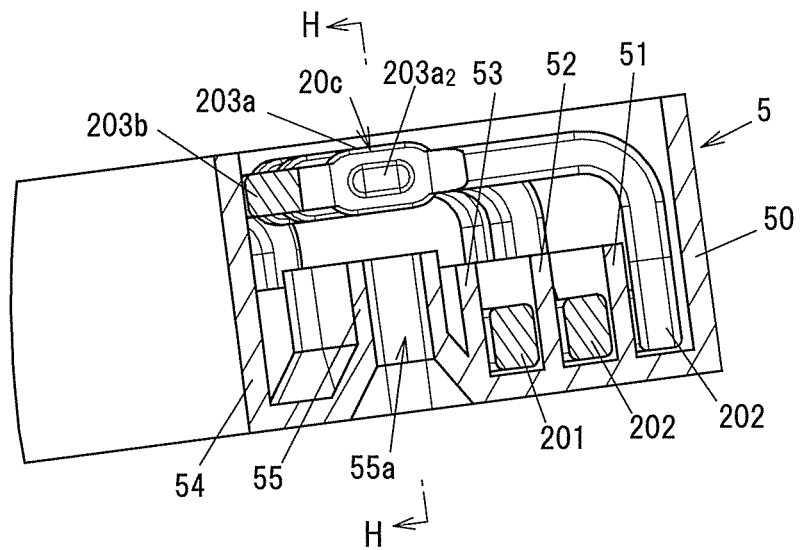
FIG. 16A is a cross sectional view taken along line G-G in FIG. 15
Figure 16B:
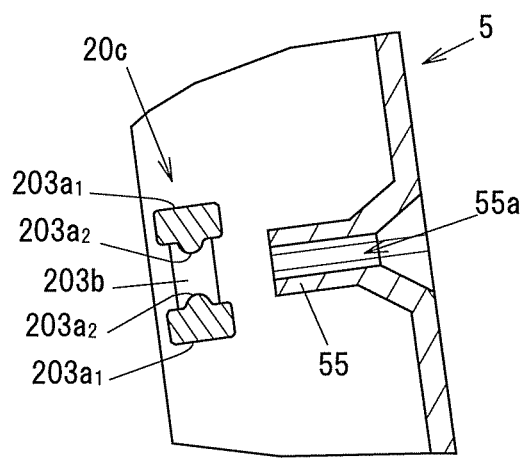
FIG. 16B is a cross sectional view taken along line H-H in FIG. 16A.

FIGS. 13A and 13B show a centralized power distribution member 2C in the fourth embodiment, wherein FIG. 13A is a partial enlarged view and FIG. 13B is a cross sectional view of FIG. 13A taken along the first lead-out wire 113a. FIGS. 14A and 14B are diagrams based on FIGS. 13A and 13B but illustrations of the first lead-out wires 111a, 112a and 113a are omitted. FIG. 15 is an explanatory diagram illustrating a lead-out wire inserting portion 20c and the periphery thereof as viewed from the axial direction of the annular holding member 5. FIG. 16A is a cross sectional view taken along line G-G in FIG. 15. FIG. 16B is a cross sectional view taken along line H-H in FIG. 16A.

Constituent elements having substantially the same functions as those described in the third embodiment are denoted by the same reference numerals in FIGS. 13A to 16B and an overlapped explanation thereof will be omitted.

While the metal conductors 271, 281 and 291 of the first to third bus rings 27 to 29 are covered with the sheaths 270, 280 and 290 in the centralized power distribution member 2B of the third embodiment, first to third bus rings 201 to 203 in the centralized power distribution member 2C of the fourth embodiment are formed of a so-called bare wire and are not covered with a sheath. In addition, while the metal conductors 271, 281 and 291 of the first to third bus rings 27 to 29 in the third embodiment have a circular cross section, the first to third bus rings 201 to 203 in the fourth embodiment are formed to have a rectangular cross section.

Note that, although illustration is omitted, the power supply terminals 27c, 28c and 29c (see FIGS. 8A and 8B) are connected to the first to third bus rings 201 to 203 by thermal crimping in the same manner as the centralized power distribution member 2B in the third embodiment.

The third bus ring 203 is housed between the outer wall 50 and the first partition wall 51 in the annular holding member 5. The second first bus ring 202 is housed between the first partition wall 51 and the second partition wall 52. The first bus ring 201 is housed between the second partition wall 52 and the third partition wall 53. In other words, the first bus ring 201 is insulated from the second first bus ring 202 by the second partition wall 52 and the second first bus ring 202 is insulated from the third bus ring 203 by the first partition wall 51.

A lead-out wire inserting portion 20a for inserting the first lead-out wire 111a is formed on the first bus ring 201. The lead-out wire inserting portion 20a is composed of a pair of straight portions 201a extending inward along the radial direction of the annular holding member 5 and a curved portion 201b for coupling respective end portions (front end portions on the inner side) of the pair of straight portions 201a in a circular-arc manner. The pair of straight portions 201a are formed parallel to each other and the curved portion 201b is formed in a semi-circular shape.

Likewise, lead-out wire inserting portions 20b and 20c for inserting the first lead-out wires 112a and 113a are formed on the second and third bus rings 202 and 203. The lead-out wire inserting portion 20b or 20c is composed of a pair of straight portions 202a or 203a extending inward along the radial direction of the annular holding member 5 and a curved portion 202b or 203b for coupling respective end portions of the pair of straight portions 202a or 203a.

The lead-out wire inserting portions 20a, 20b and 20c have the same shape in which the pairs of straight portions 201a, 202a and 203a are respectively formed in parallel to each other and the curved portions 201b, 202b and 203b are formed in a semi-circular shape. A width in the axial direction of the annular holding member 5 is wider in the straight portions 201a, 202a and 203a than in the curved portions 201b, 202b and 203b.

Protrusions $201a_2$, $202a_2$ or $203a_2$ are formed on the facing surfaces of the pair of straight portions 201a, 202a or 203a. In the fourth embodiment, the protrusions $201a_2$, $202a_2$ and $203a_2$ are formed as a protruding strip having a semi-circular cross sectional shape and extending along an extending direction of the straight portions 201a, 202a and 203a (the radial direction of the annular holding member 5).

Meanwhile, surfaces of the pair of straight portions 201a, 202a or 203a opposite to the surfaces having the protrusions $201a_2$, $202a_2$ or $203a_2$ are formed as flat planar surfaces $201a_1$, $202a_1$ or $203a_1$. The planar surface $201a_1$, $202a_1$ or $203a_1$ of one of the pair of straight portions 201a, 202a or 203a and that of the other straight portion 201a, 202a or 203a are parallel to each other.

When the lead-out wire inserting portion 20a is crimped, the protrusions $201a_2$ of the pair of straight portions 201a come into contact with the first lead-out wire 111a from both sides in the circumferential direction of the annular holding member 5. Likewise, when the lead-out wire inserting portion 20b or 20c is crimped, the protrusions $202a_2$ or $203a_2$ of the pair of straight portions 202a or 203a come into contact with the first lead-out wire 112a or 113a from both sides in the circumferential direction of the annular holding member 5.

In addition, when the lead-out wire inserting portions 20a, 20b and 20c are thermally crimped by the electrodes 41 and 42 as shown in FIG. 4 in the first embodiment, the protrusions $201a_2$, $202a_2$ and $203a_2$ of the straight portions 201a, 202a and 203a are respectively welded to the first lead-out wires 111a, 112a and 113a. At this time, the electrodes 41 and 42 come into surface-contact with the planar surfaces $201a_1$, $202a_1$ or $203a_1$ of the pair of straight portions 201a, 202a or 203a.

The same functions and effects as those described in the third embodiment are obtained in the fourth embodiment. In addition, since removal of sheath is not required for the lead-out wire inserting portions 20a, 20b and 20c, it is possible to eliminate a sheath removal step at the time of manufacture as compared to the centralized power distribution member 2B in the third embodiment.

Furthermore, forming the first to third bus rings 201 to 203 so as to have a rectangular cross section allows a width in a radial direction of the annular holding member 5 to be smaller than the case of having a circular cross section. That is, for ensuring current capacity which determines the cross sectional areas of the first to third bus rings 201 to 203, a diameter is determined uniquely when having a circular cross section but a cross sectional area of the rectangle allows a radial width to be smaller than the diameter of the circular cross section. In addition, it is possible to further reduce the size when, e.g., the radial width of the first to third bus rings 201 to 203 is smaller than an axial width, for example, as shown in FIG. 16A, etc.

Fifth Embodiment

Next, the fifth embodiment will be described in reference to FIGS. 17A to 19. Constituent elements having substantially the same functions as those described in the first embodiment are denoted by the same reference numerals in FIGS. 17A to 19 and an overlapped explanation thereof will be omitted.

Figure 17B:
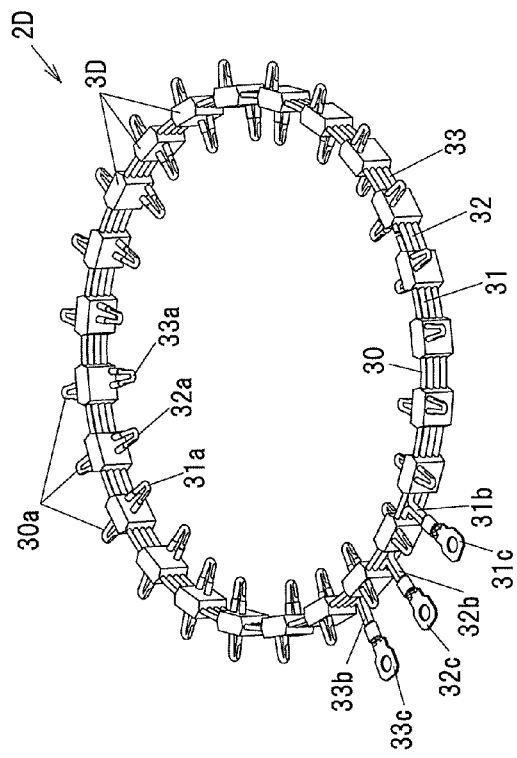
Figure 17A:
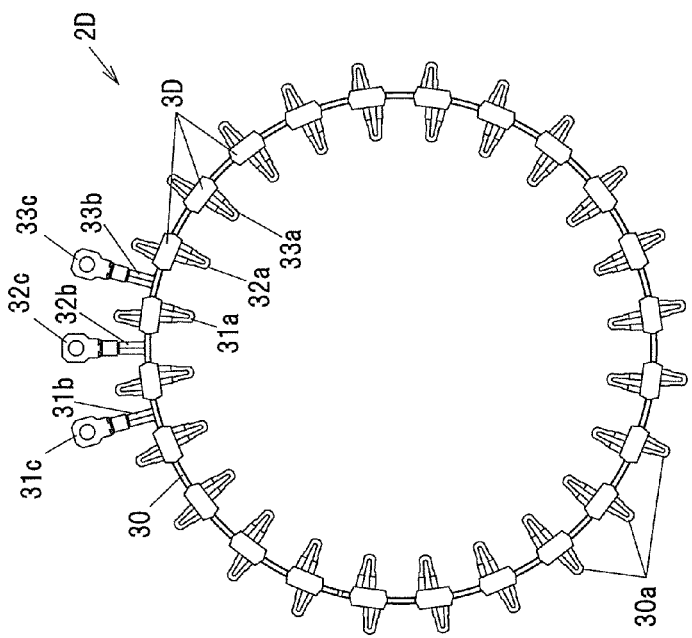

FIGS. 17A and 17B show a centralized power distribution member 2D in the fifth embodiment of the invention, wherein FIG. 17A is a front view as viewed in an axial direction of the centralized power distribution member 2D and FIG. 17B is a perspective view.

The centralized power distribution member 2D is provided with first to third bus rings 31 to 33 in place of the first to third bus rings 21 to 23 of the first embodiment. The first to third bus rings 31 to 33 are formed in an annular shape and are arranged in parallel in the axial direction of the centralized power distribution member 2D in the same manner as the first to third bus rings 21 to 23 of the first embodiment. In addition, the centralized power distribution member 2D is provided with a neutral-phase bus ring 30 in place of the neutral conductor 20 of the first embodiment. The neutral-phase bus ring 30 is formed in an annular shape and is arranged in parallel in the axial direction of the centralized power distribution member 2D in the same manner as the first to third bus rings 31 to 33. In the fifth embodiment, the neutral-phase bus ring 30, the first bus ring 31, the second bus ring 32 and the third bus ring are arranged in this order from the upper side in the axial direction of the centralized power distribution member 2D.

A power supply terminal 31c for receiving a supply of a U-phase drive current which flows through the first bus ring 31 is thermally crimped to an end portion 31b of the first bus ring 31 and protrudes radially outward of the centralized power distribution member 2D. Likewise, a power supply terminal 32c for receiving a supply of a V-phase drive current which flows through the second bus ring 32 is thermally crimped to an end portion 32b of the second bus ring 32 and a power supply terminal 33c for receiving a supply of a W-phase drive current which flows through the third bus ring 33 is thermally crimped to an end portion 33b of the third bus ring 33 so that the power supply terminals 32c and 33c protrude radially outward of the centralized power distribution member 2D.

The first to third bus rings 31 to 33 are held by plural holding members 3D provided at plural positions in a circumferential direction of the first to third bus rings 31 to 33 in the same manner as the first embodiment, but the shape of lead-out wire inserting portions 31a, 32a and 33a is different from that of the lead-out wire inserting portions 21a, 22a and 23a of the first embodiment. In addition, plural lead-out wire inserting portions 30a are formed on the neutral-phase bus ring 30 in the same manner as the first to third bus rings 31 to 33.

Figure 18:
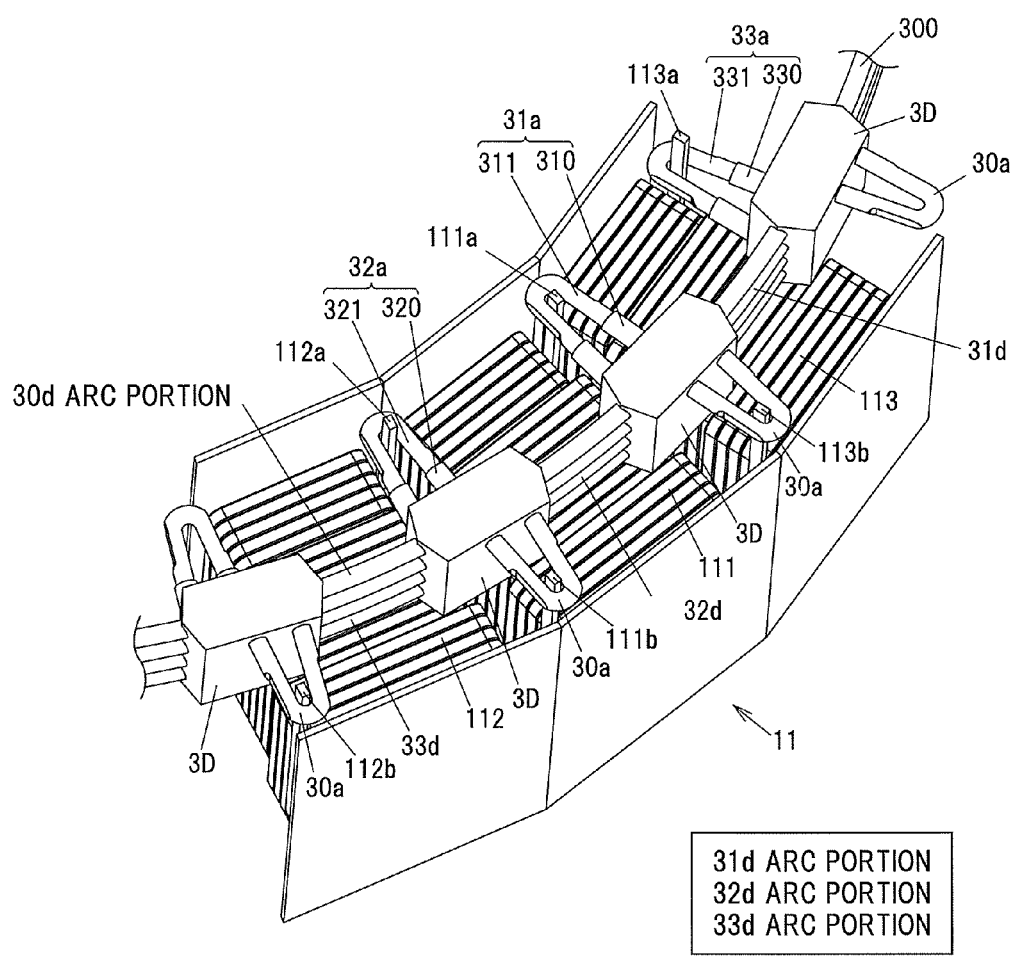
FIG. 18 is a partial enlarged view showing an example of a connection structure between a centralized power distribution member and a lead-out wire.

FIG. 18 is a partial enlarged view showing an example of a connection structure between the centralized power distribution member 2D and the windings 111, 112 and 113.

The first bus ring 31 has plural lead-out wire inserting portions 31a formed on plural circumferential positions and plural arc portions 31d formed between the plural lead-out wire inserting portions 31a. The plural lead-out wire inserting portions 31a protrude radially inward of the plural arc portions 31d. Likewise, the second and third bus rings 32 and 33 respectively have plural lead-out wire inserting portions 32a and 33a and plural arc portions 32d and 33d, and the plural lead-out wire inserting portions 32a and 33a protrude radially inward of the plural arc portions 32d and 33d.

The neutral-phase bus ring 30 has plural lead-out wire inserting portions 30a formed on plural circumferential positions and plural arc portions 30d formed between the plural lead-out wire inserting portions 30a. The plural lead-out wire inserting portions 30a protrude radially outward of the plural arc portions 30d. In other words, the lead-out wire inserting portions 31a, 32a and 33a of the first to third bus rings 31 to 33 protrude radially inward of the arc portions 31d, 32d and 33d, and the lead-out wire inserting portions 30a of the neutral-phase bus ring 30 protrude radially outward of the arc portions 30d.

In the fifth embodiment, the neutral-phase bus ring 30 has twenty-four lead-out wire inserting portions 30a, and the first to third bus rings 31 to 33 have eight lead-out wire inserting portions 31a, 32a or 33a. In other words, a protruding direction of the lead-out wire inserting portions 30a of the neutral-phase bus ring 30 which has the largest number of lead-out wire inserting portions is opposite to a protruding direction of the other lead-out wire inserting portions 31a, 32a and 33a of the first to third bus rings 31 to 33. Note that, the sum (twenty-four) of the numbers of the lead-out wire inserting portions 31a, 32a and 33a (eight each) of the first to third bus rings 31 to 33 matches the number of the lead-out wire inserting portions 30a (twenty-four) of the neutral-phase bus ring 30.

The lead-out wire inserting portions 31a, 32a and 33a of the first to third bus rings 31 to 33 protrude radially inward of the arc portions 31d, 32d and 33d from the holding members 3D which are provided along a circumferential direction of the neutral-phase bus ring 30 as well as of the first to third bus rings 31 to 33, and the lead-out wire inserting portions 30a of the neutral-phase bus ring 30 protrude radially outward of the arc portions 30d from the holding members 3D.

The neutral-phase bus ring 30 and the first to third bus rings 31 to 33 are arranged in the middle, in the radial direction, of the U-phase winding 111, the V-phase winding 112 and the W-phase winding 113 which are wound around the teeth 110 (see FIG. 1). Also, the neutral-phase bus ring 30 and the first to third bus rings 31 to 33 are arranged on one side in the axial direction of the stator 11.

The U-phase winding 111, the V-phase winding 112 and the W-phase winding 113 are arranged along the circumferential direction of the stator 11. The holding member 3D is located on a gap formed between adjacent windings on the one side in an axial direction (see FIG. 19). In more detail, the holding member 3D and the lead-out wire inserting portions 30a and 32a protruding therefrom are arranged on a gap formed between the U-phase winding 111 and the V-phase winding 112 on the one side in the axial direction of the stator 11, the holding member 3D and the lead-out wire inserting portions 30a and 33a protruding therefrom are arranged on a gap formed between the V-phase winding 112 and the W-phase winding 113 on the one side of the stator 11 in the axial direction, and the holding member 3D and the lead-out wire inserting portions 30a and 31a protruding therefrom are arranged on a gap formed between the W-phase winding 113 and the U-phase winding 111 on the one side in the axial direction of the stator 11.

As shown in FIG. 18, the first lead-out wire 111a of the U-phase winding 111 is inserted into the lead-out wire inserting portion 31a of the first bus ring 31 and the second lead-out wire 113b of the W-phase winding 113 is inserted into the lead-out wire inserting portion 30a of the neutral-phase bus ring 30 which protrudes from the holding member 3D toward the side opposite to the lead-out wire inserting portion 31a. The first lead-out wire 112a of the V-phase winding 112 is inserted into the lead-out wire inserting portion 32a of the second bus ring 32 and the second lead-out wire 111b of the U-phase winding 111 is inserted into the lead-out wire inserting portion 30a of the neutral-phase bus ring 30 which protrudes from the holding member 3D toward the side opposite to the lead-out wire inserting portion 32a. The first lead-out wire 113a of the W-phase winding 113 is inserted into the lead-out wire inserting portion 33a of the third bus ring 33 and the second lead-out wire 112b of the V-phase winding 112 is inserted into the lead-out wire inserting portion 30a of the neutral-phase bus ring 30 which protrudes from the holding member 3D toward the side opposite to the lead-out wire inserting portion 33a. Accordingly, a second lead-out wire of a winding, which is arranged next to another winding having a first lead-out wire inserted into the lead-out wire inserting portion 31a, 32a or 33a and is adjacent to the other winding in a counterclockwise direction (on the right-hand side in FIG. 18) on the stator 11, is inserted into each of the lead-out wire inserting portions 30a of the neutral-phase bus ring 30 corresponding to the lead-out wire inserting portions 31a, 32a and 33a of the first to third bus rings 31 to 33.

The first bus ring 31 is composed of a metal conductor 311 formed of a good conductivity metal such as copper and an insulating resin sheath 310 covering the metal conductor 311, and the lead-out wire inserting portion 31a is formed by bending the metal conductor 311. Likewise, the second and third bus rings 32 and 33 are respectively composed of metal conductors 321 and 331 and sheaths 320 and 330, and the lead-out wire inserting portions 32a and 33a are formed by bending the metal conductors 321 and 331. The lead-out wire inserting portions 31a, 32a and 33a are formed on portions in which the sheaths 310, 320 and 330 are removed. The neutral-phase bus ring 30 is formed of a metal conductor 300 formed of a good conductivity metal such as copper, and the lead-out wire inserting portion 30a is formed by bending the metal conductor 300. Unlike the first to third bus rings 31 to 33, the neutral-phase bus ring 30 is a bare wire, and accordingly, the lead-out wire inserting portion 30a of the neutral-phase bus ring 30 is formed smaller than the lead-out wire inserting portions 31a, 32a and 33a of the first to third bus rings 31 to 33.

Since the lead-out wire inserting portions 31a, 32a and 33a are formed in the same manner, the lead-out wire inserting portion 32a of the second bus ring 32 will be taken as an example and described in more detail. In addition, since the lead-out wire inserting portion 30a of the neutral-phase bus ring 30 is also formed in the same manner, the lead-out wire inserting portion 30a corresponding the lead-out wire inserting portion 32a of the second bus ring 32 will be taken as an example.

Figure 19:
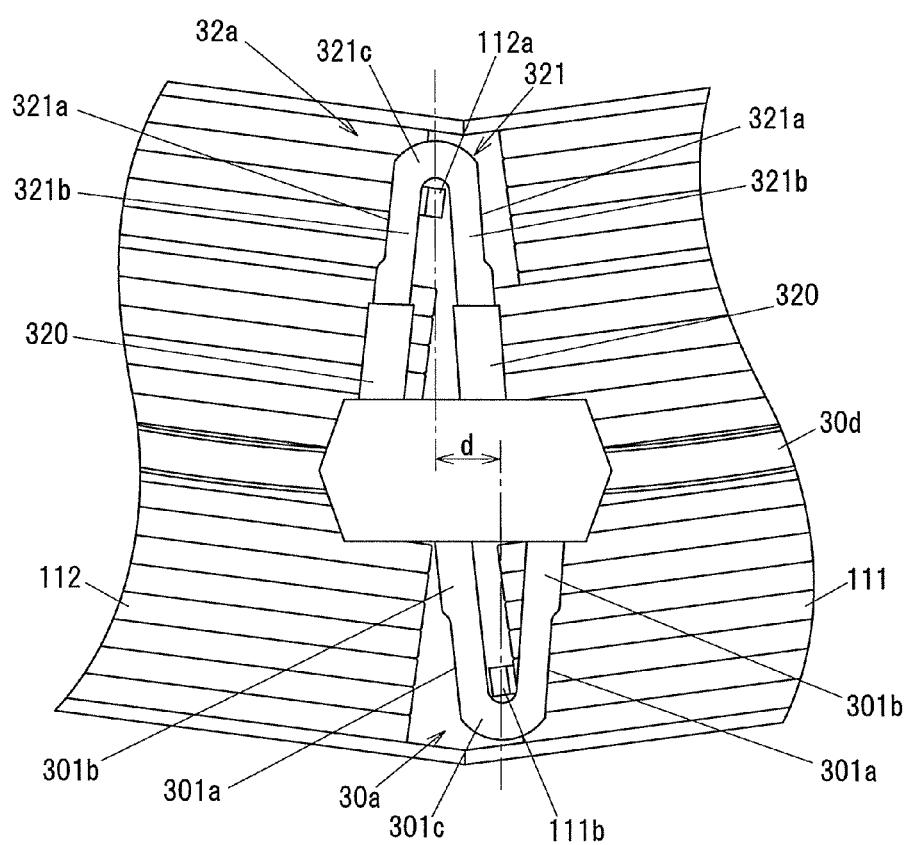
FIG. 19 is an explanatory diagram illustrating the lead-out wire inserting portions and the periphery thereof as viewed in an axial direction of the centralized power distribution member.

FIG. 19 is an explanatory diagram illustrating the lead-out wire inserting portions 30a and 32a and the periphery thereof as viewed in the axial direction of the centralized power distribution member 2D.

The lead-out wire inserting portion 32a is composed of a pair of straight portions 321b linearly extending radially inward of the arc portion 32d from the holding member 3D and a curved portion 321c for coupling respective end portions of the pair of straight portions 321b in a circular-arc manner. As shown in FIG. 19, the first lead-out wire 112a is inserted in a region surrounded by the pair of straight portions 321b and the curved portion 321c.

The lead-out wire inserting portion 30a of the neutral-phase bus ring 30 is composed of a pair of straight portions 301b linearly extending radially outward of the arc portion 30d from the holding member 3D and a curved portion 301c for coupling respective end portions of the pair of straight portions 301b in a circular-arc manner. As shown in FIG. 19, the second lead-out wire 111b is inserted in a region surrounded by the pair of straight portions 301b and the curved portion 301c.

The pair of straight portions 321b and the pair of straight portions 301b respectively have flat surfaces 321a and 301a on the curved portion 321c, 301c sides. When the lead-out wire inserting portions 32a and 30a are thermally crimped by electrodes, the electrodes come into surface-contact with the flat surfaces 321a and 301a. The plural lead-out wire inserting portions 30a, 31a, 32a and 33a are each crimped (thermal crimping) in the same manner.

The lead-out wire inserting portion 32a of the second bus ring 32 and the lead-out wire inserting portion 30a of the neutral-phase bus ring 30 protrude in a manner offset to one another (a width d in FIG. 19) in a circumferential direction of the centralized power distribution member 2D so that the lead-out wire inserting portion 32a is arranged at a leading-out position of the first lead-out wire 112a and the lead-out wire inserting portion 30a is arranged at a leading-out position of the second lead-out wire 111b. The width d is set to correspond to a width of each gap in the circumferential direction of the stator 11 between the U-phase winding 111, the V-phase winding 112 and the W-phase winding 113 so that the first lead-out wires 111a, 112a and 113a and the second lead-out wire 111b, 112b and 113b each pulled out in the axial direction of the stator 11 from a circumferential end portion of the gap are inserted into the lead-out wire inserting portion 30a, 31a, 32a and 33a.

In the fifth embodiment, the following effects are obtained in addition to the same functions and effects as those described in the first embodiment.

The lead-out wire inserting portions 30a of the neutral-phase bus ring 30 protrude radially outward of the arc portions 30d and the lead-out wire inserting portions 31a, 32a and 33a of the first to third bus rings 31 to 33 protrude radially inward of the arc portions 31d, 32d and 33d. That is, since plural lead-out wire inserting portions 30a, 31a, 32a and 33a protrude radially inward and outward (inside and outside) of the arc portions 30d, 31d, 32d and 33d, it is possible to form the lead-out wire inserting portions 30a, 31a, 32a and 33a more densely than the case where all of the lead-out wire inserting portions 30a, 31a, 32a and 33a protrude inward or outward. This leads to size reduction of the centralized power distribution member 2D and the electric motor 1.

In addition, the lead-out wire inserting portions 30a of the neutral-phase bus ring 30 which is a bare wire are smaller than the lead-out wire inserting portions 31a, 32a and 33a of the first to third bus rings 31 to 33 which are covered with the sheaths 310, 320 and 330. It is possible to downsize the centralized power distribution member 2D by forming such lead-out wire inserting portions 30a so as to protrude radially outward of the arc portions 30d.

In addition, since the neutral-phase bus ring 30 and the first to third bus rings 31 to 33 are arranged in the middle, in the radial direction, of the U-phase winding 111, the V-phase winding 112 and the W-phase winding 113 which are wound around the teeth 110, it is possible to downsize the centralized power distribution member 2D and the electric motor 1 as compared to the case where the neutral-phase bus ring 30 and the first to third bus rings 31 to 33 are arranged radially outside of the U-phase winding 111, the V-phase winding 112 and the W-phase winding 113.

In addition, since the lead-out wire inserting portion 30a, 31a, 32a and 33a protrude in a manner offset to one another in the circumferential direction of the centralized power distribution member 2D so as to be arranged at respective leading-out positions of the lead-out wires to be inserted, it is not necessary to route a lead-out wire to a corresponding lead-out wire inserting portion.

Summary of the Embodiments

Technical ideas understood from the above described embodiments will be described below citing the reference numerals, etc., used for the embodiments. However, each reference numeral, etc., described below is not intended to limit the constituent elements in the claims to the members specifically described in the embodiments.

[1] An electric motor (1) provided with a stator (11) formed by winding multiple phase windings (111, 112, 113) around plural teeth (110), and annular first to third bus rings (21 to 23) arranged concentrically with the stator (11) to supply drive current to the windings (111, 112, 113), wherein lead-out wire inserting portions (21a, 22a, 23a) for inserting first lead-out wires (111a, 112a, 113a) of the windings (111, 112, 113) are formed on the first to third bus rings (21 to 23) by bending metal conductors (211, 221, 231), and the lead-out wire inserting portions (21a, 22a, 23a) are crimped in a state that the first lead-out wires (111a, 112a, 113a) are inserted therethrough for electrical connection to the metal conductors (211, 221, 231).

[2] The electric motor (1) described in [1], wherein the lead-out wire inserting portions (21a, 22a, 23a) are thermally crimped in a state that the first lead-out wires (111a, 112a, 113a) are inserted therethrough and the metal conductors (211, 221, 231) and the first lead-out wires (111a, 112a, 113a) are melted and joined together.

[3] The electric motor (1) described in [2], wherein, at the time of the thermal crimping the lead-out wire inserting portions (21a, 22a, 23a), contact areas between the first lead-out wires (111a, 112a, 113a) and the metal conductors (211, 221, 231) are smaller than contact areas between the metal conductors (211, 221, 231) and electrodes receiving an electric current for the thermal crimping.

[4] The electric motor (1) described in any one of [1] to [3], wherein the lead-out wire inserting portions (24a, 25a, 26a) have an Ω-shape including a pair of bent portions (251a) and a curved portion (251c) formed therebetween, the bend portion (251a) being bent at an acute angle with respect to a circumferential direction of the first to third bus rings (24 to 26).

[5] The electric motor (1) described in any one of [1] to [4], wherein a neutral-phase bus ring (30) and the first to third bus rings (31 to 33) have plural lead-out wire inserting portions (30a, 31a, 32a, 33a) formed at plural circumferential positions and plural arc portions (30d, 31d, 32d, 33d) formed between the plural lead-out wire inserting portions (30a, 31a, 32a, 33a), and the lead-out wire inserting portions (30a, 31a, 32a, 33a) protrude in a radial direction of the plural arc portions (30d, 31d, 32d, 33d).

[6] The electric motor (1) described in [5] provided with the neutral-phase bus ring (30) and the first to third bus rings (31 to 33), wherein the plural lead-out wire inserting portions (31a, 32a, 33a) of the first to third bus rings (31 to 33), among the neutral-phase bus ring (30) and the first to third bus rings (31 to 33), protrude radially inward of the plural arc portions (31d, 32d, 33d) and the plural lead-out wire inserting portions (30a) of the neutral-phase bus ring (30) protrude radially outward of the plural arc portions (30d).

[7] The electric motor (1) described in [6], a protruding direction of the lead-out wire inserting portion (30a) of the neutral-phase bus ring (30), among the neutral-phase bus ring (30) and the first to third bus rings (31 to 33), is opposite to a protruding direction of the lead-out wire inserting portions (31a, 32a, 33a) of the first to third bus rings (31 to 33).

[8] The electric motor (1) described in [6] or [7], the neutral-phase bus ring (30) and the first to third bus rings (31 to 33) are held by holding members (3D) provided at plural positions in a circumferential direction, the lead-out wire inserting portions (31a, 32a, 33a) of the first to third bus rings (31 to 33) protrude radially inward from the holding members (3D) and the lead-out wire inserting portions (30a) of the neutral-phase bus ring (30) protrude radially outward from the holding members (3D).

[9] The electric motor (1) described in any one of [6] to [8], wherein the lead-out wire inserting portions (30a) of the neutral-phase bus ring (30) and the lead-out wire inserting portions (31a, 32a, 33a) of the first to third bus rings (31 to 33) protrude in a manner offset in a circumferential direction so as to be respectively arranged at leading-out positions of second lead-out wire (111b, 112b, 113b) and those of the first lead-out wires (111a, 112a, 113a).

[10] A centralized power distribution member (2) provided with annular first to third bus rings (21 to 23) for collecting and distributing power to multiple phase windings (111, 112, 113) of a stator (11) that is formed by winding the windings (111, 112, 113) around plural teeth (110) arranged in a circular pattern, wherein lead-out wire inserting portions (21a, 22a, 23a) for inserting first lead-out wires (111a, 112a, 113a) of the windings (111, 112, 113) are formed on the first to third bus rings (21 to 23) by bending metal conductors (211, 221, 231) constituting the first to third bus rings (21 to 23), and the lead-out wire inserting portions (21a, 22a, 23a) are crimped in a state that the first lead-out wires (111a, 112a, 113a) are inserted therethrough and the metal conductors (211, 221, 231) are thereby electrically connected to the lead-out wires (111a, 112a, 113a).

Although the embodiments of the invention have been described, the invention according to claims is not to be limited to the above-mentioned embodiments. Further, please note that all combinations of the features described in the embodiments are not necessary to solve the problem of the invention.

The invention can be appropriately modified and implemented without departing from the gist thereof. For example, although the centralized power distribution members 2, 2A, 2B and 2C provided with three bus rings have been described in the first to fourth embodiments, four bus rings including an additional neutral conductor may be provided. Alternatively, the invention is applicable to a centralized power distribution member provided with a single bus ring formed of only a neutral conductor.

In addition, although the lead-out wire inserting portions 30a of the neutral-phase bus ring 30 protrude radially outward of the arc portions 30d in the fifth embodiment, it is not limited thereto as long as the lead-out wire inserting portions of at least one of the neutral-phase bus ring 30 and the first to third bus rings 31 to 33 protrude radially outward of the arc portions.

In addition, although the first to third bus rings 31 to 33 are partially covered with the sheaths 310, 320 and 330 and the neutral-phase bus ring 30 is a bare wire in the fifth embodiment, it is not limited thereto and the bare wire may be one of the neutral-phase bus ring 30 and the first to third bus rings 31 to 33.

In addition, although the holding member 3D is located on a gap between adjacent windings in the fifth embodiment, it is not limited thereto and the holding member 3D may be located on each of the windings 111, 112 and 113.

What is claimed is:

1. An electric motor, comprising:
   a stator comprising multiple phase windings wound around a plurality of teeth arranged annularly; and
   an annular bus ring arranged concentrically with the stator to supply drive current to the windings, the bus ring being formed of a metal conductor and including a lead-out wire inserting portion with a lead-out wire of the winding inserted therein, the lead-out wire inserting portion being formed by bending the metal conductor such that the lead-out wire inserting portion and metal conductor are one piece, the lead-out wire inserting portion being in a U-shape and including one pair of bent portions, the lead-out wire being inserted in the lead-out wire inserting portion, crimped by both sides of the lead-out wire inserting portion and clamped in the lead-out wire inserting portion, with the one pair of bent portions being not in contact with each other when the lead-out wire inserting portion and the lead-out wire are electrically connected together.

2. The electric motor according to claim 1, wherein the lead-out wire inserting portion is thermally crimped with the lead-out wire inserted therein such that the metal conductor and the lead-out wire are melted and joined together.

3. The electric motor according to claim 2, wherein, when the lead-out wire inserting portion is thermally crimped, a contact area between the lead-out wire and the metal conductor is smaller than a contact area between the metal conductor and an electrode receiving an electric current for the thermal crimping.

4. The electric motor according to claim 1, wherein the lead-out wire inserting portion has an Ω-shape and comprises a pair of bent portions and a curved portion formed therebetween, the bend portion being bent at an acute angle with respect to a circumferential direction of the bus ring.

5. The electric motor according to claim 1, wherein the bus ring comprises a plurality of the lead-out wire inserting portions formed at a plurality of circumferential positions and a plurality of arc portions formed between the plurality of the lead-out wire inserting portions, and wherein the lead-out wire inserting portion protrudes in a radial direction of the plurality of arc portions.

6. The electric motor according to claim 5, wherein the bus ring comprises a plurality of bus rings, wherein the plurality of the lead-out wire inserting portions of at least one of the plurality of bus rings protrude radially inward of the plurality of arc portions and the plurality of the lead-out wire inserting portions of other bus rings protrude radially outward of the plurality of arc portions.

7. The electric motor according to claim 6, wherein, a protruding direction of the lead-out wire inserting portions of the bus ring having the largest number of the plurality of the lead-out wire inserting portions among the plurality of bus rings is opposite to a protruding direction of the lead-out wire inserting portions of the other bus rings.

8. The electric motor according to claim 6, wherein the plurality of bus rings are held by holding members provided at a plurality of positions in a circumferential direction, wherein the lead-out wire inserting portions of the at least one bus ring protrude radially inward from the holding members, and wherein the lead-out wire inserting portions of the other bus rings protrude radially outward from the holding members.

9. The electric motor according to claim 6, wherein the lead-out wire inserting portions of the at least one bus ring and the lead-out wire inserting portions of the other bus rings protrude in a manner offset in a circumferential direction so as to be arranged at leading-out positions of the lead-out wires.

10. The electric motor according to claim 1, further comprising a holding member for holding the bus ring, the lead-out wire inserting portion projecting from the holding member.

11. The electric motor according to claim 10, wherein the lead-out wire inserting portion is projecting from the holding member inward and outward in a radial direction of the bus ring.

12. A centralized power distribution member, comprising:
an annular bus ring for collecting and distributing power to multiple phase windings of a stator that is formed by winding the windings around a plurality of teeth arranged annularly, the bus ring being formed of a metal conductor and including a lead-out wire inserting portion with a lead-out wire of the winding inserted therein, the lead-out wire inserting portion being formed by bending the metal conductor such that the lead-out wire inserting portion and metal conductor are one piece, the lead-out wire inserting portion being in a U-shape and including one pair of bent portions, the lead-out wire being inserted in the lead-out wire inserting portion, crimped by both sides of the lead-out wire inserting portion and clamped in the lead-out wire inserting portion, with the one pair of bent portions being not in contact with each other when the lead-out wire inserting portion and the lead-out wire are electrically connected together.

13. The centralized power distribution member according to claim 12, further comprising a holding member for holding the bus ring, the lead-out wire inserting portion projecting from the holding member.

14. The centralized power distribution member according to claim 13, wherein the lead-out wire inserting portion is projecting from the holding member inward and outward in a radial direction of the bus ring.

* * * * *